(12) United States Patent
Yokoyama et al.

(10) Patent No.: US 7,570,388 B2
(45) Date of Patent: Aug. 4, 2009

(54) EXPOSURE DEVICE

(75) Inventors: Masafumi Yokoyama, Tokyo (JP);
Akira Shiota, Saitama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 355 days.

(21) Appl. No.: 10/553,427

(22) PCT Filed: Dec. 8, 2004

(86) PCT No.: PCT/JP2004/018671

§ 371 (c)(1),
(2), (4) Date: Oct. 18, 2005

(87) PCT Pub. No.: WO2005/056298

PCT Pub. Date: Jun. 23, 2005

(65) Prior Publication Data

US 2006/0290906 A1     Dec. 28, 2006

(30) Foreign Application Priority Data

Dec. 12, 2003 (JP) ............... 2003-414009
Mar. 30, 2004 (JP) ............... 2004-097306
Sep. 3, 2004 (JP) ............... 2004-256408

(51) Int. Cl.
*H04N 1/40* (2006.01)
*G06K 15/00* (2006.01)
*H04N 1/46* (2006.01)
*H04N 5/00* (2006.01)

(52) U.S. Cl. ............... 358/1.7; 358/3.01; 358/3.07; 358/503; 358/509; 358/3.23; 358/296

(58) Field of Classification Search ............... 358/506, 358/1.9, 1.15, 1.14, 1.11; 355/77, 30; 396/564; 347/253, 194; 399/49

See application file for complete search history.

(56) References Cited

U.S. PATENT DOCUMENTS 4,736,244 A * 4/1988 Shiota et al. ............... 358/506

(Continued)

FOREIGN PATENT DOCUMENTS

JP     6-98168     4/1994

(Continued)

*Primary Examiner*—King Y Poon
*Assistant Examiner*—Akwasi M Sarpong
(74) *Attorney, Agent, or Firm*—Finnegan, Henderson, Farabow, Garrett & Dunner, L.L.P.

(57) ABSTRACT

The invention provides an exposure apparatus that outputs a stable photographic quality image unaffected by variations in ambient temperature, by suppressing the effects of the temperature variations and achieving accurate grayscale reproduction. In the exposure apparatus, input grayscale data P4 is converted into corrected grayscale data by using a conversion table for correcting for the nonlinearity of exposure density, and grayscale exposure is performed on a photosensitive material by controlling exposure conditions in an exposure head based on the corrected grayscale data; here, the conversion table actually comprises a plurality of conversion tables one for each designated temperature region, and a temperature detector is provided for detecting the ambient temperature, with provisions made to select an appropriate one of the conversion tables under the control of select data in accordance with the temperature data supplied from the temperature detector. The exposure apparatus can thus achieve accurate grayscale reproduction and output a stable photographic quality image even when the ambient temperature varies.

21 Claims, 19 Drawing Sheets

U.S. PATENT DOCUMENTS

| | | | |
|---|---|---|---|
| 4,975,737 A * | 12/1990 | Murooka et al. | 355/77 |
| 5,668,589 A * | 9/1997 | Kuwabara et al. | 347/253 |
| 5,748,858 A * | 5/1998 | Ohtsuka et al. | 358/1.9 |
| 6,856,410 B1 * | 2/2005 | Hasegawa et al. | 358/1.11 |
| 6,917,418 B2 * | 7/2005 | Fujishima et al. | 356/153 |
| 7,400,840 B2 * | 7/2008 | Hattori | 399/49 |
| 2002/0036757 A1 * | 3/2002 | Katakura et al. | 355/30 |
| 2002/0131080 A1 * | 9/2002 | Enomoto | 358/1.15 |
| 2003/0142340 A1 * | 7/2003 | Watanabe | 358/1.14 |
| 2003/0214570 A1 * | 11/2003 | Ito et al. | 347/194 |
| 2004/0086273 A1 * | 5/2004 | Horiuchi et al. | 396/564 |

FOREIGN PATENT DOCUMENTS

| | | |
|---|---|---|
| JP | 8-227113 | 9/1996 |
| JP | 2001-8139 | 1/2001 |
| JP | 2001-133911 | 5/2001 |
| JP | 2002-72364 | 3/2002 |

* cited by examiner

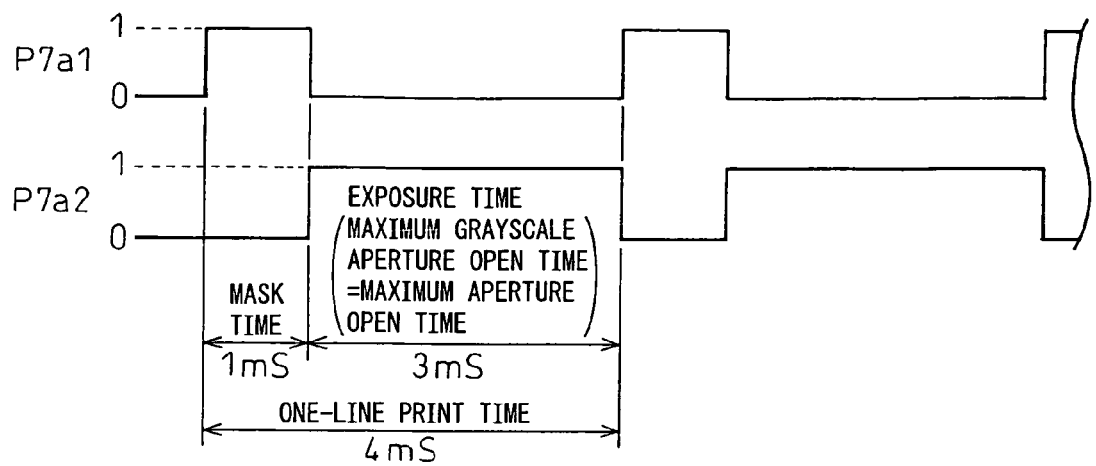
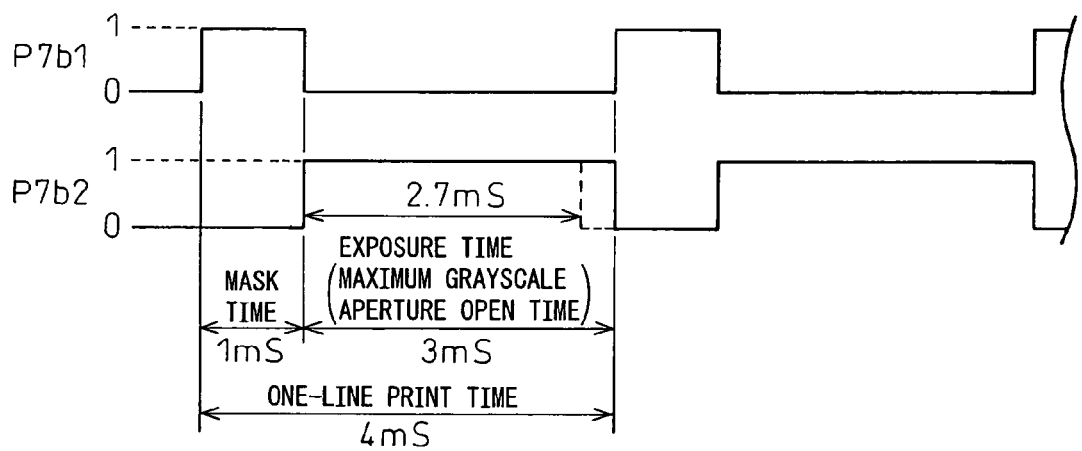
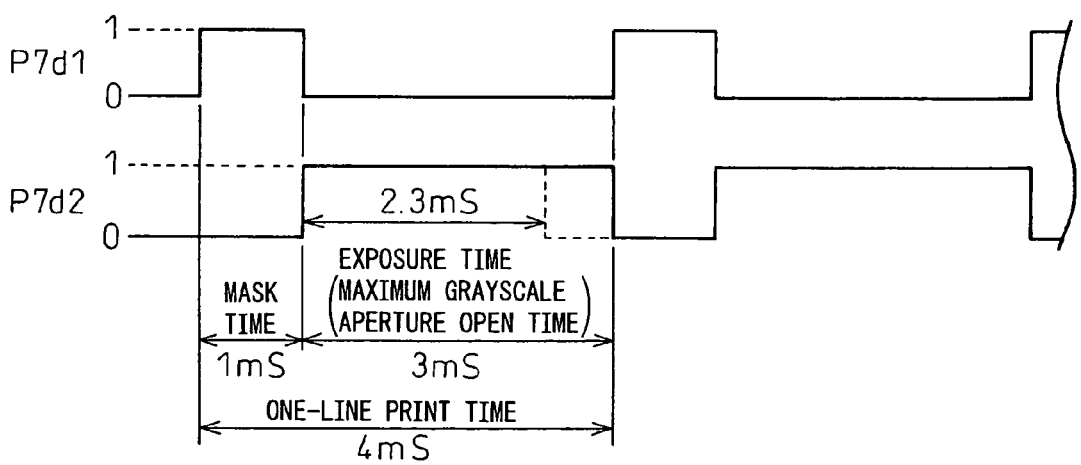

FIG.17

| PIXEL N / GRAYSCALE LEVEL | EXCLUDED PIXEL REGION | | | | | TARGET PIXEL REGION | | | | | | | | | | | | | | EXCLUDED PIXEL REGION | | | | |
|---|---|---|---|---|---|---|---|---|---|---|---|---|---|---|---|---|---|---|---|---|---|---|---|---|
| | 0 | 1 | 2 | 3 | 4 | 5 | 6 Fmin | . | . | . | 123 | 124 | 125 | . | . | . | 473 | 474 | 475 | 476 | 477 | 478 | 479 |
| 0 | ↑ | ↑ | ↑ | ↑ | ↑ | 0 | 0 | . | . | . | 0 | 0 | 0 | . | . | . | 0 | 0 | ↓ | ↓ | ↓ | ↓ | ↓ |
| 1 | ↑ | ↑ | ↑ | ↑ | ↑ | 0 | 1 | . | . | . | 0 | 0 | 0 | . | . | . | 0 | 0 | ↓ | ↓ | ↓ | ↓ | ↓ |
| 2 | ↑ | ↑ | ↑ | ↑ | ↑ | 1 | 2 | . | . | . | 0 | 1 | 0 | . | . | . | 0 | 1 | ↓ | ↓ | ↓ | ↓ | ↓ |
| . | . | . | . | . | . | . | . | | | | . | . | . | | | | . | . | . | . | . | . | . |
| . | . | . | . | . | . | . | . | | | | . | . | . | | | | . | . | . | . | . | . | . |
| . | . | . | . | . | . | . | . | | | | . | . | . | | | | . | . | . | . | . | . | . |
| 127 | ↑ | ↑ | ↑ | ↑ | ↑ | 125 | 127 | . | . | . | 115 | 125 | 119 | . | . | . | 118 | 120 | ↓ | ↓ | ↓ | ↓ | ↓ |
| 128 | ↑ | ↑ | ↑ | ↑ | ↑ | 126 | 128 | . | . | . | 116 | 126 | 120 | . | . | . | 119 | 121 | ↓ | ↓ | ↓ | ↓ | ↓ |
| 129 | ↑ | ↑ | ↑ | ↑ | ↑ | 127 | 129 | . | . | . | 117 | 127 | 121 | . | . | . | 120 | 122 | ↓ | ↓ | ↓ | ↓ | ↓ |
| . | . | . | . | . | . | . | . | | | | . | . | . | | | | . | . | . | . | . | . | . |
| . | . | . | . | . | . | . | . | | | | . | . | . | | | | . | . | . | . | . | . | . |
| . | . | . | . | . | . | . | . | | | | . | . | . | | | | . | . | . | . | . | . | . |
| 253 | ↑ | ↑ | ↑ | ↑ | ↑ | 248 | 253 | . | . | . | 236 | 249 | 241 | . | . | . | 240 | 243 | ↓ | ↓ | ↓ | ↓ | ↓ |
| 254 | ↑ | ↑ | ↑ | ↑ | ↑ | 250 | 254 | . | . | . | 238 | 251 | 243 | . | . | . | 242 | 245 | ↓ | ↓ | ↓ | ↓ | ↓ |
| 255 | ↑ | ↑ | ↑ | ↑ | ↑ | 252 | 255 | . | . | . | (240) | 253 | 245 | . | . | . | 244 | 247 | ↓ | ↓ | ↓ | ↓ | ↓ |

EXPOSURE DEVICE

TECHNICAL FIELD

The present invention relates to an exposure apparatus for outputting an image and, more particularly, to a digital exposure apparatus which outputs a stable image by eliminating the effects of ambient temperature.

BACKGROUND OF THE INVENTION

Various types of digital exposure apparatus have been developed, one type being an exposure apparatus utilizing a fluorescent head. This fluorescent head has a cathode electrode and an anode electrode both sealed within an evacuated case, and dots formed by phosphors are arranged in a line on the anode electrode. When a voltage is applied to the cathode electrode, electrons are emitted from the cathode electrode and, when the emitted electrons impinge on the anode electrode, the phosphors are excited to produce light. The exposure apparatus utilizing such a fluorescent head outputs the thus produced light to expose a photosensitive material to print an image thereon. In the exposure apparatus utilizing such a fluorescent head, when many dots are illuminated at a time, more electrons are emitted from the end portions of the cathode electrode than from the center portion thereof; as a result, of the dots arrayed in a line on the anode electrode, the dots at the end portions tend to become brighter than the dots in the center portion.

However, when a large current flows to the end portions of the cathode electrode, the temperature at the end portions of the cathode electrode increases. When the amount of oxides scattering from the end portions increases, the scattering oxides adhere to the phosphors, and the efficiency of light emission drops. As a result, there arises the problem that, as the accumulated time of light emission increases, the dots in the end portions of the dot array become darker. To solve this problem, there has been proposed a method that uses a storage means for storing a plurality of data tables for controlling the light emission of each individual dot and a switching means for switching between the plurality of data tables, and that corrects for the variations in the amount of light between the end and center portions of the dot array on a dot-by-dot basis by switching between the data tables (for example, patent document 1: Japanese Unexamined Patent Publication No. H07-256921).

According to the fluorescent head disclosed in the patent document 1, since the variations in the amount of light, occurring between the end and center portions of the dot array as the accumulated time of light emission increases, can be corrected for on a dot-by-dot basis, uniform exposure can be achieved even when the accumulated time of light emission increases. Furthermore, as the adjustment of print density can be accomplished by switching between the data tables, there is no need to provide a drive voltage adjusting circuit, etc. for adjusting the print density.

Other types of digital exposure apparatus include, for example, an LED exposure apparatus which comprises light-emitting diodes (hereinafter abbreviated LEDs) substantially arranged in a line, and which outputs a photographic image by controlling the amount of light emission of each LED in accordance with image data. The LEDs used as light sources in this type of exposure apparatus have the problem that the amount of light emission and their spectral characteristics vary depending on the ambient temperature. There is the further problem that the spectral sensitivity characteristics of the photosensitive material to be exposed also vary depending on the ambient temperature. To solve these problems, there has been proposed an exposure correction method that controls the LED drive current by taking into account the amount of light emission and the spectral characteristics of the LEDs in relation to the temperature and the spectral sensitivity characteristics of the photosensitive material, thereby maintaining exposure conditions constant irrespective of variations in temperature (for example, patent document 2: Japanese Examined Patent Publication No. H04-046472).

In the exposure correction method disclosed in the patent document 2, correction coefficient tables are constructed by taking into account the amount of light emission and the spectral characteristics of the LEDs in relation to the temperature and the spectral sensitivity characteristics of the photosensitive material; then, an appropriate one of the correction coefficient tables is selected in accordance with the temperature, and the input image data is multiplied in a multiplier by a correction coefficient to correct the image data, the method thus aiming to stabilize the exposure conditions.

As another type of exposure apparatus, an exposure apparatus has been developed that outputs a photographic image by controlling the exposure time in accordance with grayscale data by means of an optical shutter whose elements are arranged in a line. Generally, a PLZT device or a liquid crystal shutter or the like is used as the optical shutter in this type of exposure apparatus; however, because of the presence of a rise time, i.e., the time taken to achieve a transmissive state after applying a voltage for turning on the optical shutter, and the presence of a fall time, i.e., the time taken to achieve a non-transmissive state after applying a voltage for turning it off, the relationship between the ON voltage application time and the amount of exposure light is nonlinear. Furthermore, the relationship between the amount of exposure light and the exposure density (i.e., the print density) on the photosensitive material is also nonlinear. There has therefore been the problem that correct grayscale cannot be reproduced even if the photosensitive material is exposed to light from a photographic image or the like by controlling the optical shutter proportionally to the grayscale data.

To solve this problem, an exposure apparatus has been proposed that comprises a converting means for correcting the exposure density having a nonlinear relationship to the grayscale data, and an exposure control means for controlling the exposure time based on the corrected exposure time data output from the converting means (for example, patent document 3: Japanese Patent No. 2956556). The exposure apparatus disclosed in the patent document 3 aims to achieve correct grayscale reproduction by using a conversion table, which defines a correspondence between the grayscale data and the corrected exposure time data for obtaining the exposure density (or the amount of exposure light) proportional to the grayscale data, and a referencing means for referencing the conversion table and outputting the corrected exposure time data that matches the input grayscale data.

There has also been developed an exposure apparatus of the type that forms an image by an electrophotographic method by illuminating a photoconductor with laser light. This laser exposure apparatus has had the problem that the image density changes with temperature and humidity because the photoconductor has a temperature and humidity dependence.

To solve this problem, it has been proposed to store as many look-up tables as there are temperature/humidity conditions, and to compensate for changes in temperature and humidity by switching between the look-up tables as the temperature and humidity change (for example, patent document 4: Japanese Unexamined Patent Publication No. H05-197262).

SUMMARY OF THE INVENTION

However, in the fluorescent head disclosed in the patent document 1, while the amount of light varying with the accumulated time of light emission can be corrected on a dot-by-dot basis by switching between the data tables, no consideration is given to the correction for the amount of light of the fluorescent head that varies with the ambient temperature or to the correction for the amount of light associated with the temperature characteristics of the photosensitive material. In particular, it is known that the sensitivity characteristics of the photosensitive material vary with the ambient temperature and, as a result, the relationship between the amount of exposure light and the exposure density varies as the temperature changes. There has therefore been the critical problem that, even if the amount of exposure light from the fluorescent head is maintained constant, the sensitivity characteristics of the photosensitive material vary with the ambient temperature, causing the hue and density of halftone portions to change and thus resulting in an inability to obtain a good quality image.

On the other hand, in the exposure correction method disclosed in the patent document 2, the amount of exposure light is corrected by multiplying the image data by a correction coefficient that changes with temperature. However, in this method, as only one correction coefficient is used to multiply the image data over the entire grayscale range of the image data (for example, in the case of 8-bit grayscale, the range of grayscale levels from 0 to 255), the correction is made for the temperature by using the same value for all the grayscale levels. In actuality, however, the relationship between the grayscale level and the amount of exposure light, as well as the relationship between the amount of exposure light and the density on the photosensitive material, is nonlinear and, also, they do not have a constant relationship to the temperature. That is, with the above exposure correction method, there has been the problem that, while phenomena such as whiteout or a loss of black shades occurring in the photographic image due to temperature changes can be suppressed to a certain extent, it is difficult to achieve stable grayscale reproduction by correcting the subtle changes in the density of halftone portions occurring due to temperature changes.

In the case of the exposure apparatus disclosed in the patent document 3, as correction is made using a conversion table which defines a correspondence between the grayscale data and the corrected exposure time data for obtaining the exposure density (or the amount of exposure light) proportional to the grayscale data, relatively accurate grayscale reproduction can be achieved, but no consideration is given to the effects that variations in the ambient temperature will have on the exposure. That is, as the rise time and fall time of the optical shutter used as the exposure means vary with the temperature, the nonlinear relationship between the grayscale data and the amount of exposure light also varies with the temperature. Furthermore, as the sensitivity characteristics of the photosensitive material also vary with the ambient temperature, the nonlinear relationship between the amount of exposure light and the exposure density (i.e., the print density) also varies with the temperature. Accordingly, the exposure apparatus disclosed in the patent document 3 has had the following problem; that is, a relatively accurate grayscale reproduction can be achieved with exposure under a constant temperature condition, but if the exposure apparatus is used in a rapidly changing environment as in the case of a portable type exposure apparatus that is often used in an outdoor environment, it is difficult to achieve accurate grayscale reproduction because the exposure density changes due to changes in the ambient temperature.

On the other hand, in the exposure apparatus disclosed in the patent document 4, it is proposed to store as many look-up tables as there are temperature/humidity conditions, and to compensate for changes in temperature and humidity by switching between the look-up tables as the temperature and humidity change. However, this exposure apparatus has had the problem that, if look-up tables covering all the temperature/humidity conditions are to be stored, an enormous storage capacity becomes necessary and, besides, there arises a need to switch from one look-up table to another even when a slight change occurs in the temperature or humidity.

An object of the present invention is to provide an exposure apparatus that solves the above-enumerated problems.

Another object of the present invention is to provide an exposure apparatus that can achieve stable grayscale reproduction unaffected by temperature variations.

Still another object of the present invention is to provide an exposure apparatus that, even when the ambient temperature varies, can achieve visually desirable grayscale reproduction and output a stable photographic quality image by suppressing the effects of the temperature variation.

Yet another object of the present invention is to provide an exposure apparatus that achieves a stable, high-quality image unaffected by temperature variations, by correcting for variations occurring in the hue and density of halftone portions due to variations in the ambient temperature.

A further object of the present invention is to provide an exposure apparatus in which the time required to print on a photosensitive material is constant irrespective of temperature variations.

An exposure apparatus according to the present invention comprises a plurality of converters for converting input grayscale data into corrected grayscale data so as to correct for nonlinearity of exposure density, an exposure member for performing grayscale exposure on a photosensitive material based on the corrected grayscale data, a temperature detector for detecting an ambient temperature, and a selecting member for selecting an appropriate one of the converters in accordance with the ambient temperature detected by the temperature detector, wherein the plurality of converters is set up so that each range of amount of exposure light is divided into substantially equal regions each corresponding to a temperature region to be covered by each of the plurality of converters.

As described, the plurality of converters for correcting for the nonlinearity of exposure density are provided one for each designated temperature region, the temperature detector is provided to detect the ambient temperature, and the grayscale data is corrected prior to exposure by selecting an appropriate one of the plurality of converters in accordance with the temperature detected by the temperature detector; accordingly, even when the ambient temperature varies, a stable photographic quality image, etc. can be obtained by suppressing the effects of the temperature variation.

Furthermore, as the correction is performed by equally dividing the variation range of the amount of exposure light, the amount of correction error for temperature is constant in any temperature region, and the invention can thus provide an exposure apparatus that outputs a stable photographic quality image unaffected by temperature variations.

Preferably, the plurality of converter are configured to correct for at least either a change in the amount of exposure light of the exposure means with respect to the detected temperature or for a change in the sensitivity characteristic of the photosensitive material with respect to the detected temperature.

If provisions are made to correct for at least either a change in the amount of exposure light with respect to the detected temperature or for a change in the sensitivity characteristic of the photosensitive material with respect to the detected temperature, the exposure apparatus can achieve stable grayscale reproduction unaffected by variations in ambient temperature.

Preferably, each temperature range to be covered by each of plurality of converters is divided into regions of unequal width.

Since the converters are divided so as to match the nonlinear characteristics of the amount of exposure light relative to the variation of the temperature, the invention can provide an exposure apparatus in which the amount of correction error is small, and in which the converters can be divided efficiently.

Preferably, the plurality of converters are set up so that any converter to be used in a higher temperature region covers a wider temperature range than any converter to be used in a lower temperature region.

As the converters, whether in a low temperature region or a high temperature region, are divided so as to match the nonlinear characteristics of the amount of exposure light relative to the variation of the temperature, the invention can provide an exposure apparatus in which the amount of correction error is small whether in a low temperature region or a high temperature region, and in which the converters can be divided efficiently.

Further, in the exposure apparatus of the present invention, each temperature range to be covered by each of plurality of converters can also be divided into substantially equal regions.

In this case, as the converters are equally divided with respect to the variation of the temperature, the switching control of the converters is simplified, which contributes, for example, to a speedup of the print output.

An exposure apparatus according to the present invention comprises a line light source for exposure, a plurality of converters, provided one for each designated temperature region, for converting input grayscale data into corrected grayscale data to correct for nonlinearity of exposure density, and a shutter member for optically modulating light emerging from the line light source, and for performing grayscale exposure on a photosensitive material by optically modulating the light emerging from the line light source while controlling an aperture open time in accordance with the corrected grayscale data supplied from the converter, wherein the aperture open time of the shutter member, corresponding to maximum grayscale data, is set substantially constant for all of the plurality of converters.

As the plurality of converters for nonlinearly correcting the grayscale data such as image data are provided to cover the entire temperature range, and as the aperture open time corresponding to the maximum grayscale data is substantially constant for all of the converters, stable grayscale reproduction can be achieved by correcting the subtle changes in the density of halftone portions occurring due to temperature changes. Furthermore, as the aperture open time of the shutter member corresponding to the maximum grayscale data is constant for all of the plurality of converter each covering a different temperature region, the invention can provide an exposure apparatus in which the print time is maintained constant irrespective of temperature variations.

An exposure apparatus according to the present invention comprises a line light source for exposure, a shutter member for optically modulating light emerging from the line light source, a light amount corrector for applying a light amount correction to correct for a variation in the amount of the emergent light optically modulated by the shutter member, and a plurality of converters, provided one for each designated temperature region, wherein each of the plurality of converters outputs corrected grayscale data by nonlinearly correcting the grayscale data corrected by the light amount correcter, and the shutter member performs grayscale exposure on a photosensitive material by optically modulating the light emerging from the line light source while controlling an aperture open time in accordance with the corrected grayscale data supplied from the converter with the light amount correction superimposed thereon, wherein the aperture open time of the shutter member corresponding to maximum grayscale data is set substantially constant for all of the plurality of converters.

As the light amount corrector is provided to correct for any variation in the amount of the emergent light from the shutter member, a density unevenness on the photosensitive material can be reduced. Further, as the plurality of converter for nonlinearly correcting the grayscale data such as image data are provided to cover the entire temperature range, and as the aperture open time corresponding to the maximum grayscale data is substantially constant for all of the plurality of converter, stable grayscale reproduction can be achieved by correcting the subtle changes in the density of halftone portions occurring due to temperature changes. Furthermore, as the aperture open time of the shutter member corresponding to the maximum grayscale data is constant for all of the plurality of converter each covering a different temperature region, the invention can provide an exposure apparatus in which the print time is maintained constant at all times irrespective of temperature variations.

Preferably, the grayscale data range to be controlled by each of the plurality of converters comprises a first grayscale range where the relationship between the grayscale data for each of the plurality of converter and the aperture open time of the shutter member matches the grayscale density of the photosensitive material, and a second grayscale range where the relationship between the grayscale data for each of the plurality of converter and the aperture open time does not match the grayscale density on the photosensitive material.

Because of the provision of the first grayscale range where the relationship between the grayscale data and the aperture open time of the shutter member matches the grayscale density on the photosensitive material, the exposure apparatus can correct the subtle changes in the density of halftone portions and can achieve stable grayscale reproduction unaffected by temperature variations. Further, because of the provision of the second grayscale range where the relationship between the grayscale data and the aperture open time does not match the grayscale density on the photosensitive material, the aperture open time corresponding to the maximum grayscale data can be made the same for all of the plurality of converters. Accordingly, the invention can provide an exposure apparatus in which the time required to print on the photosensitive material does not change even when the converters are switched from one to another as the temperature changes, and which can print a stable image unaffected by temperature variations.

Preferably, the second grayscale range is a grayscale range where a grayscale value is large.

In the grayscale range where the grayscale value is large, as the effect on the image is small, the aperture open time corresponding to the maximum grayscale data can be made the same for all of the plurality of converter without affecting the density variation in halftone portions that greatly affects the image quality. Further, an exposure apparatus can be provided that achieves a stable, high-quality image unaffected by temperature variations, and that can maintain the print time constant at all times irrespective of temperature variations.

An exposure apparatus according to the present invention comprises a light source for exposure, a plurality of converters provided one for each designated temperature region, for converting input grayscale data into corrected grayscale data to correct for nonlinearity of exposure density, and a shutter member for optically modulating light emerging from the light source, and for performing grayscale exposure on a photosensitive material by optically modulating the light emerging from the light source while controlling an aperture open time in accordance with the corrected grayscale data supplied from the converter, wherein a print time per unit area is set substantially constant for all of the plurality of converter.

As the plurality of converters are provided one for each different temperature region, and as the print time per unit area is substantially constant for all of the plurality of converters, the exposure apparatus can maintain the print time per unit area constant at all times irrespective of temperature variations even when the converters are switched from one to another as the ambient temperature changes.

Preferably, the print time per unit area is the time required to print one line on the photosensitive material.

As the print time per unit area is the time required to print one line on the photosensitive material, the time for printing one line on the photosensitive material remains substantially unchanged even when the converter is switched from one to another as the ambient temperature changes; as a result, the invention can provide an exposure apparatus in which the time required to print on the photosensitive material is maintained constant at all times irrespective of temperature variations.

Preferably, the print time required to print one line includes a mask time for performing data transfer and the like and a maximum grayscale aperture open time of the shutter member corresponding to maximum grayscale data.

As the print time required to print one line includes the mask time for performing data transfer and the like and the maximum grayscale aperture open time which defines the exposure time of the photosensitive material, the exposure apparatus can maintain the one-line print time substantially constant for all of the plurality of converters by adjusting either the mask time or the maximum grayscale aperture open time or both for temperature variations.

Preferably, the print time required to print one line is the sum of the mask time and a maximum aperture open time which is the longest maximum grayscale aperture open time of all the maximum grayscale aperture open times defined by the converter.

As the longest print time required to print one line is the sum of the mask time and the maximum aperture open time which is the longest maximum grayscale aperture open time of all the maximum grayscale aperture open times corresponding to the maximum grayscale data, the exposure apparatus can maintain the print time constant at all times irrespective of temperature variations by making the one-line print time equal to the sum of the mask time and the maximum aperture open time, even when the converters are switched from one to another as the ambient temperature changes.

Preferably, the mask time is varied among the plurality of converters so that the print time required to print one line becomes substantially constant for all of the plurality of converter.

As any difference in maximum grayscale aperture open time between the converter is adjusted by varying the mask time, the one-line print time can be maintained substantially constant without changing the maximum grayscale aperture open time of any converter, and thus the invention can provide an exposure apparatus that can maintain the print time constant at all times.

Preferably, the mask time is held constant for each of the plurality of converters, and a grayscale aperture close time is provided in addition to the maximum grayscale aperture open time so that the print time required to print one line becomes substantially constant for all of the plurality of converter.

As any difference in maximum grayscale aperture open time between the converter is adjusted by providing the grayscale aperture close time while holding the mask time constant, the one-line print time can be maintained substantially constant while holding the mask time constant and without changing the maximum grayscale aperture open time of any converter. As a result, the exposure apparatus can simplify the exposure control and can maintain the print time constant at all times.

Preferably, the grayscale aperture close time is equal to a time difference between the maximum aperture open time and the maximum grayscale aperture open time in each of the plurality of converters.

Since the grayscale aperture close time is set equal to the time difference between the maximum aperture open time, which is the longest maximum grayscale aperture open time of all the maximum grayscale aperture open times defined by the respective converter, and the maximum grayscale aperture open time in each of the plurality of converters, the difference of the maximum grayscale aperture open time in each of plurality of converter relative to the maximum aperture open time is adjusted by the grayscale aperture close time so that the sum becomes equal to the maximum aperture open time. As a result, as the one-line print time can be maintained substantially constant while holding the mask time constant and without changing the maximum grayscale aperture open time of any converter, the exposure apparatus can simplify the exposure control and can maintain the print time constant at all times.

Preferably, the mask time is held constant for each of the plurality of converters, and the maximum grayscale aperture open time is set approximately equal to the maximum aperture open time.

As the maximum grayscale aperture open time in each converting means is corrected so that it becomes equal to the maximum aperture open time which is the longest maximum grayscale aperture open time of all the maximum grayscale aperture open times defined by the respective converter, the one-line print time can be maintained substantially constant while holding the mask time constant and without requiring the provision of the grayscale aperture close time. As a result, the exposure apparatus can simplify the exposure control and can maintain the print time constant at all times.

Preferably, the grayscale data range to be controlled by each of the plurality of converters comprises a first grayscale range where the relationship between the grayscale data for each of the plurality of converters and the aperture open time of the shutter member substantially matches grayscale density on the photosensitive material, and a second grayscale range where the relationship between the grayscale data for each of the plurality of converters and the aperture open time does not match the grayscale density on the photosensitive material.

Because of the provision of the first grayscale range where the relationship between the grayscale data and the aperture open time of the shutter member substantially matches the grayscale density on the photosensitive material, the exposure apparatus can correct the subtle changes in the density of halftone portions and can achieve stable grayscale reproduction unaffected by temperature variations. Further, because of the provision of the second grayscale range where the relationship between the grayscale data and the aperture open time does not match the grayscale density on the photosensitive material, the maximum grayscale aperture open time corresponding to the maximum grayscale data in each of plurality of converter can be made equal to the maximum aperture open time; accordingly, the invention can provide an exposure apparatus in which the time required to print on the photosensitive material is maintained constant at all times even when the converters are switched from one to another as the temperature changes.

Preferably, the second grayscale range is a grayscale range where a grayscale value is large.

In the grayscale range where the grayscale value is large, as the effect on the image is small, the maximum grayscale aperture open time corresponding to the maximum grayscale data in each of plurality of converter can be made equal to the maximum aperture open time. As a result, an exposure apparatus can be provided that achieves a stable, high-quality image unaffected by temperature variations, and that can maintain the print time constant at all times irrespective of temperature variations.

An exposure apparatus according to the present invention comprises a line light source for exposure, a shutter member for optically modulating light emerging from the line light source, a light amount corrector for applying a light amount correction to correct for a variation in the amount of the emergent light optically modulated by the shutter member, and a plurality of converters provided one for each designated temperature region, and wherein each of the plurality of converters outputs corrected grayscale data by nonlinearly correcting the grayscale data corrected by the light amount correcter, and the shutter member performs grayscale exposure on a photosensitive material by optically modulating the light emerging from the line light source while controlling an aperture open time in accordance with the corrected grayscale data supplied from the converter with the light amount correcter superimposed thereon, wherein the mask time is held constant for each of the plurality of converter, and the maximum grayscale aperture open time in each of the plurality of converter is set approximately equal to the maximum aperture open time so that the print time required to print one line becomes substantially constant for all of the converting means.

As the light amount corrector is provided to correct for any variation in the amount of the emergent light from the shutter member, density unevenness on the photosensitive material can be reduced. Further, as the plurality of converters for nonlinearly correcting the grayscale data such as image data are provided to cover the entire temperature range, and as the maximum grayscale aperture open time corresponding to the maximum grayscale data in each of the plurality of converter is set approximately equal to the maximum aperture open time, the exposure apparatus can not only achieve stable grayscale reproduction by correcting the subtle changes in the density of halftone portions occurring due to temperature changes, but also maintain the print time constant at all times irrespective of temperature variations.

According to the present invention, as the plurality of converters for correcting for the nonlinearity of exposure density are provided one for each designated temperature region, and as the temperature detector is provided to detect the ambient temperature, and the grayscale data is corrected prior to exposure by selecting an appropriate one of the plurality of converters in accordance with the temperature detected by the temperature detector, as described above, an exposure apparatus can be provided which, even when the ambient temperature varies, can produce a stable photographic quality output by suppressing the effects of the temperature variation.

Further, according to the present invention, as the plurality of converter for nonlinearly correcting the grayscale data such as image data are provided to cover the entire temperature range, and as the aperture open time corresponding to the maximum grayscale data is maintained substantially constant for all the plurality of converter, as described above, an exposure apparatus can be provided which can not only produce a good quality image by correcting the subtle changes in the density of halftone portions occurring due to temperature changes, but also maintain the print time constant at all times irrespective of temperature variations.

Furthermore, according to the present invention, as a plurality of converters is provided for each different temperature region, and as the print time per unit area is substantially constant for all of the plurality of converters, as described above, an exposure apparatus can be provided that can maintain the print time per unit area constant at all times irrespective of temperature variations even when the converter is switched from one to another as the ambient temperature changes.

BRIEF DESCRIPTION OF THE DRAWINGS

FIG. 15A is a timing chart for explaining the exposure operation of the exposure apparatus 400 at temperatures around 6° C.

FIG. 15B is a timing chart for explaining the exposure operation of the exposure apparatus 400 at temperatures around 13.5° C.

FIG. 15C is a timing chart for explaining the exposure operation of the exposure apparatus 400 at temperatures around 25° C.

FIG. 17 is a correction data table showing one example of correction data used for shading correction.

DETAILED DESCRIPTION OF THE INVENTION

Embodiments of the present invention will be described in detail, below, with reference to the drawings.

Figure 1:
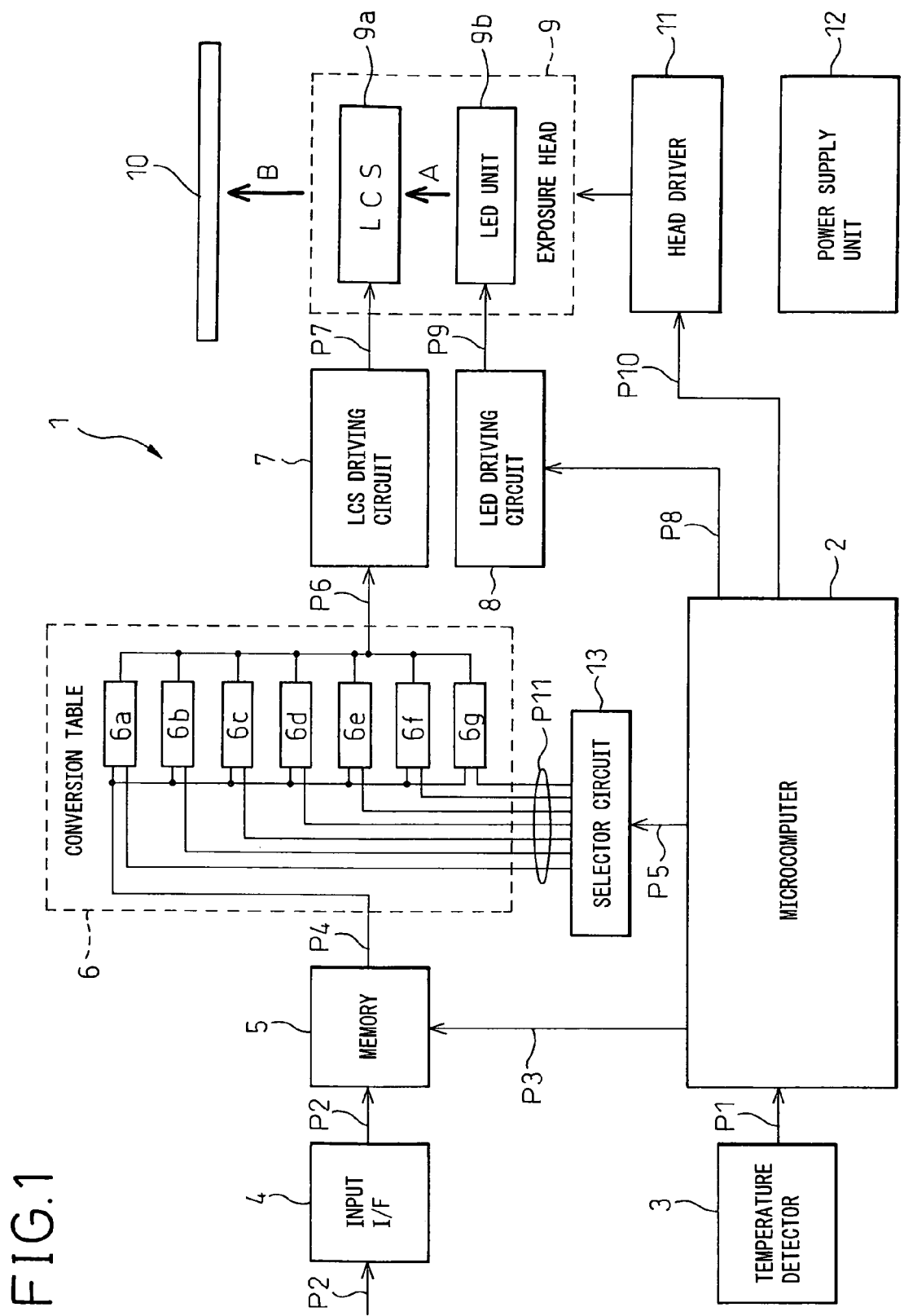
FIG. 1 is a circuit block diagram showing an overview of an exposure apparatus 1 according to the present invention.

FIG. 1 shows the configuration of an exposure apparatus 1 according to the present invention.

A microcomputer 2, which controls the entire operation of the exposure apparatus 1, contains an analog/digital (A/D) converter, an arithmetic circuit, a timer, a memory circuit, etc. though not shown here. A temperature detector 3 as a temperature detecting means for detecting the ambient temperature of the exposure apparatus 1 is constructed from a thermistor or the like, and outputs the detected temperature as temperature data P1 to the microcomputer 2. An input interface circuit (hereinafter abbreviated I/F) 4 is a circuit via which image data, etc. are input from outside the exposure apparatus 1. A memory 5 constructed from a RAM or the like stores the input data P2 (i.e., the image data, etc.) entered via the input I/F 4. The microcomputer 2 outputs a memory control signal P3 to the memory 5 to control read/write operations to the memory 5.

A conversion table 6 as a converting means takes as an input the grayscale data P4 output from the memory 5, and converts the input grayscale data P4 into corrected grayscale data P6 which is output to correct the nonlinearity of exposure density. As shown, the conversion table 6 actually comprises a plurality of conversion tables; in the example shown here, the conversion table 6 consists of seven steps, i.e., the conversion tables 6a to 6g. The grayscale data P4 is input to the conversion tables 6a to 6g; then, an appropriate one of the conversion tables is selected under the control of a select signal P11 output from a selector circuit 13 as will be described later, and the selected conversion table outputs the corrected grayscale data P6. The grayscale data P4 is image data comprising data of three primary colors of light, red (R), green (G), and blue (B), and the image data for each color usually consists of eight bits. The memory 5 therefore stores the image data for R, G, and B, respectively, and accordingly, the conversion table 6 comprises three different conversion tables, one for each of R, G, and B, to correspond with the grayscale data P4. More specifically, though not shown here, the actual conversion table 6 comprises three sets of conversion tables, one for each of R, G, and B, each set consisting of the plurality of conversion tables 6a to 6g.

Since the grayscale data P4 is usually 8-bit data that can represent 256 grayscale levels, the conversion tables 6a to 6g are each constructed from corrected grayscale data P6 of 256 levels into which to convert the grayscale data P4. Here, the conversion table 6 is preferably constructed from a rewritable nonvolatile memory. Reference numeral 13 indicates the selector circuit which receives select data P5 that the microcomputer 2 outputs based on the temperature data P1 supplied from the temperature detector 3, and which outputs the select signal P11 for selecting an appropriate one of the conversion tables 6a to 6g in the conversion table 6.

An LCS driving circuit 7 takes the corrected grayscale data P6 as an input, and outputs an LCS drive signal P7 for controlling the exposure time in accordance with the corrected grayscale data P6. An LED driving circuit 8 receives an LED control signal P8 from the microcomputer 2 and outputs an LED drive signal P9. An exposure head 9 as an exposure means comprises a liquid crystal shutter (LCS) 9a having pixels (not shown) arranged in a line, and an LED unit 9b as an exposure light source constructed from three RGB color LEDs (not shown).

A photosensitive material 10 is, for example, photographic paper, silver-halide instant film, or the like. Here, emergent light A emerging from the LED unit 9b in the exposure head 9 is optically modulated by the LCS 9a into a line of illuminating light B which illuminates the photosensitive material 10 to print an image thereon one line at a time. Reference numeral 11 indicates a head driver which receives a head control signal P10 from the microcomputer 2 and moves the exposure head 9 relative to the photosensitive material 10 to accomplish the exposure of the entire surface of the photosensitive material 10. Reference numeral 12 designates a power supply unit implemented using a secondary battery or the like, and supplies the necessary power to each block via a power supply line not shown.

Next, an overview of the operation of the exposure apparatus 1 according to the present invention will be given below. When a power switch (not shown) on the exposure apparatus 1 is turned on to supply power from the power supply unit 12 to the respective blocks, the microcomputer 2 performs processing to initialize the respective blocks. During initialization, the head driver 11 moves the exposure head 9 into its home position, i.e., the standby position. Next, when an external device (for example, a digital camera) is connected to the input I/F 4, the input data P2 (that is, the image data) from the input I/F 4 is sequentially written to the memory 5 under the control of the memory control signal P3 output from the microcomputer 2. Here, in the memory 5, image data for one frame may be stored, or image data only for a few lines may be sequentially stored. Further, in the case of a digital camera or the like, often the image data is compressed data such as JPEG compressed data; in this case, the compressed data should be expanded by the mathematical function of the microcomputer 2 into uncompressed data that can be output for printing, and the uncompressed data should be stored in the memory 5.

Next, based on the temperature data P1 supplied from the temperature detector 3, the microcomputer 2 outputs the select data P5 which is supplied to the selector circuit 13; the selector circuit 13 then decodes it internally and outputs the select signal P11 to select an appropriate one of the plurality of conversion tables 6a to 6g contained in the conversion table 6. The operation for selecting the conversion table 6 will be described in detail later. Next, under the control of the memory control signal P3 from the microcomputer 2, the image data stored in the memory 5 is sequentially output as the grayscale data P4 one line at a time for each of the R, G, and B data. Then, the conversion table 6 sequentially converts the input grayscale data P4 into the exposure correction data P6 for output. The LCS driving circuit 7 takes the exposure correction data P6 as an input, and outputs the LCS drive signal P7 for driving the LCS 9a.

Suppose, for example, that the corrected grayscale data P6 from the conversion table 6 is output in the order of R, G, and B for each line; then, based on the corrected grayscale data P6, the LCS driving circuit 7 outputs the LCS drive signal P7 in the order of R, G, and B for each line. The LCS 9a performs the exposure operation by being driven by the LCS drive signal P7 in the order of R, G, and B for each line. That is, the LCS 9a in the exposure head 9 achieves grayscale exposure by controlling the ON time and OFF time of each pixel based on the corrected grayscale data P6 and thereby varying the amount of exposure light and the exposure time of the photosensitive material 10 in a controlled manner.

The LED unit 9b sequentially turns on the three RGB LEDs (not shown) in synchronism with the operation of the LCS 9a. That is, when the LCS 9a is operating based on the corrected grayscale data P6 for R, the R LED is turned on; when the LCS 9a is operating based on the corrected grayscale data P6 for G, the G LED is turned on; and when the LCS 9a is operating based on the corrected grayscale data P6 for B, the B LED is turned on. As a result, three colors of exposure light are overlaid one above another on the photosensitive material 10, achieving a full-color print. When the RGB exposure operation for one line is completed, the grayscale data P4 for the second line is output from the memory 5 in the order of R, G, and B. Based on the grayscale data P4, the conversion table 6 outputs the corrected grayscale data P6 for the second line in the order of R, G, and B, and the LCS 9a performs the exposure operation for the second line, again in the order of R, G, and B. The head driver 11, under the control of the head control signal P10 from the microcomputer 2, successively moves the exposure head 9 in synchronism with the exposure performed for each line, to accomplish the exposure of the entire surface of the photosensitive material 10. When the exposures for all the lines are completed, the head driver 11 moves the exposure head 9 back into its home position to complete the print operation.

Figure 2A:
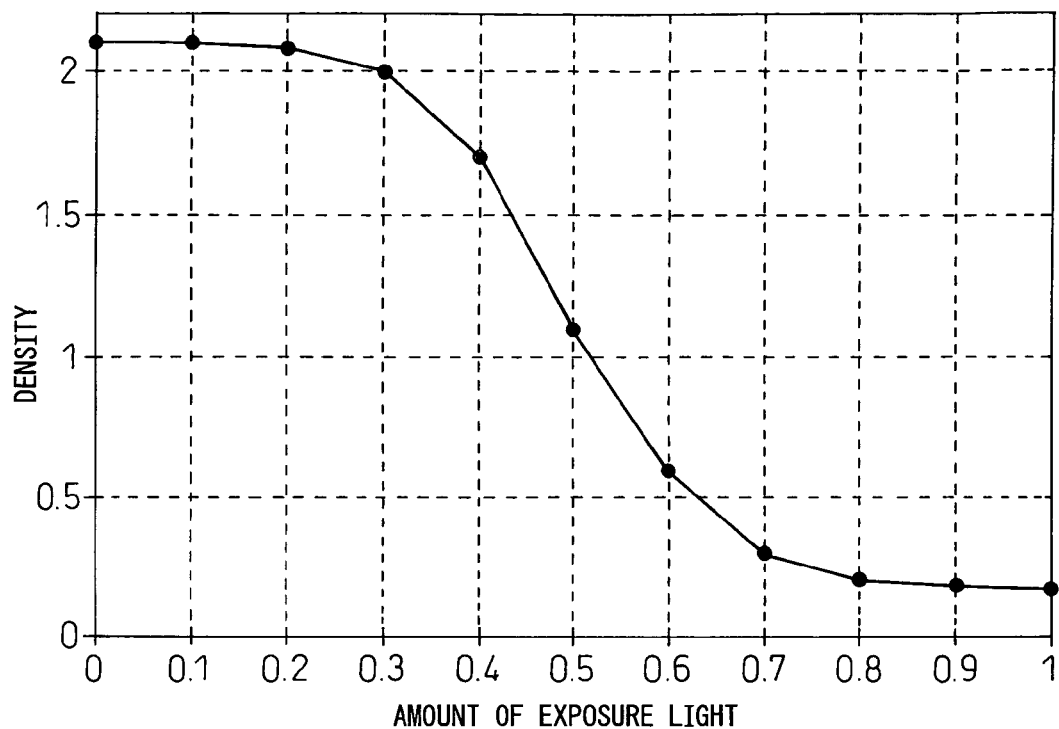
FIG. 2A is an explanatory diagram showing the relationship between the amount of exposure light and density on a photosensitive material.

FIG. 2A shows one example of the amount of exposure light versus density (i.e., print density) characteristic of the photosensitive material 10.

In FIG. 2A, the amount of exposure light is plotted along the X axis, with the value 1 representing the amount of exposure light for achieving the target white density (when R, G, and B are overlaid one above another). On the other hand, the density on the photosensitive material 10 is plotted along the Y axis; in the present embodiment, the density ranges from the black density with no light illumination (in the illustrated example, 2.10) to the target white density (in the illustrated example, 0.18). As can be seen from this characteristic diagram, the density changes nonlinearly as a function of the amount of exposure light; therefore, if, for example, the grayscale data P4 is set in such a manner as to divide the amount of exposure light into regions of equal width, phenomena such as whiteout or a loss of black shades become pronounced in regions where the amount of exposure light is small or large, resulting in an inability to achieve visually desirable grayscale reproduction that matches the grayscale data P4.

Figure 2B:
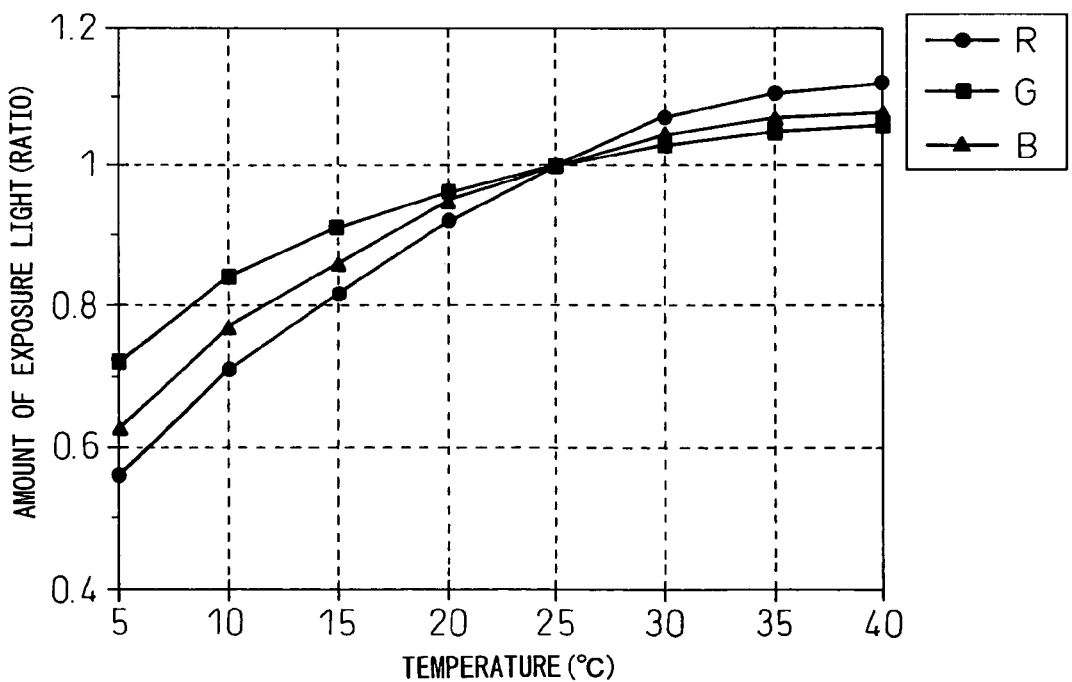
FIG. 2B is an explanatory diagram showing the amount of exposure light versus temperature characteristic of the exposure apparatus using a liquid crystal shutter.

FIG. 2B shows one example of the temperature characteristic for each of the R, G, and B components of the illuminating light A output from the exposure head 9.

In FIG. 2B, the ambient temperature of the exposure apparatus 1, detected by the temperature detector 3, is plotted along the X axis for the range of 5° C. to 40° C. The amount of exposure light, i.e., the amount of the illuminating light A falling the photosensitive material 10, is plotted along the Y axis, the value being shown in terms of the ratio relative to the amount of exposure light at 25° C. The characteristic diagram of FIG. 2B shows the data when the value of the grayscale data P4 is 255. As can be seen from the characteristic diagram, the amount of exposure light shows a characteristic curve that rises as the temperature increases, and the characteristic is different for each of the R, G, and B wavelength components. The primary cause of such a temperature characteristic is that the rise time and fall time of the LCS 9a are susceptible to temperature changes. In particular, in the low temperature region, as the rise time and the fall time greatly increase, the effective exposure time decreases. On the other hand, the reason that the temperature characteristic is different for each of the R, G, and B components is that the temperature dependence of the rise time and fall time of the LCS 9a varies with the wavelength of light. As earlier stated, the temperature characteristic shown here was measured when the value of the grayscale data P4 was 255; if this value changes, the temperature characteristic also changes.

From the two characteristic diagrams shown in FIGS. 2A and 2B, it can be understood that two measures must be taken if the exposure apparatus 1 is to achieve visually desirable grayscale exposure based on the grayscale data P4. The first measure is to correct the nonlinearity of the density with respect to the amount of exposure light shown in FIG. 2A. That is, this measure involves providing a conversion table that converts the input grayscale data P4 into corrected data which is used to correct for the nonlinearity. This conversion table corresponds to the conversion table 6 shown in FIG. 1, and the corrected data resulting from the conversion corresponds to the corrected grayscale data P6. Here, the nonlinearity of the amount of exposure light versus density characteristic shown in FIG. 2A is due to the exposure characteristic that the photosensitive material possesses, but apart from this, the relationship between the grayscale data P4 and the amount of exposure light for the LCS is also nonlinear; therefore, it is preferable that the conversion table 6 be constructed so as to correct not only for the nonlinear relationship between the amount of exposure light and the density for the photosensitive material but also for the nonlinear relationship between the grayscale data P4 and the amount of exposure light for the LCS.

The second measure is to correct the amount of exposure light versus temperature characteristic of FIG. 2B for each of the R, G, and B components. That is, a plurality of conversion tables, each identical to the conversion table 6 employed in the first measure, are provided one for each temperature region, and an appropriate one of the conversion tables 6 is selected according to the ambient temperature to output the corrected grayscale data P6 that corrects for the variation of the amount of exposure light in that temperature region. For example, in the low temperature region, as the amount of exposure light decreases as shown in FIG. 2B, the output level of the corrected grayscale data P6 is increased by an amount equal to the amount of the decrease; conversely, in the high temperature region, as the amount of exposure light increases, the output level of the corrected grayscale data P6 is decreased by an amount equal to the amount of the increase. However, as the amount of exposure light versus temperature characteristic of FIG. 2B changes when the value of the grayscale data P4 (that is, the amount of exposure light) changes, it is preferable that the amount of correction to be applied by the corrected grayscale data P6 be also adjusted according to the value of the grayscale data P4.

The amount of exposure light versus temperature characteristic of FIG. 2B shows the temperature characteristic of the illuminating light A output from the exposure head 9, but it should also be noted that the sensitivity characteristic of the photosensitive material 10 also has a temperature dependence. Accordingly, it is preferable that the conversion table 6 be constructed so as to correct for the variation of the sensitivity characteristic of the photosensitive material 10 with respect to the temperature as well as for the variation of the amount of exposure light from the exposure head 9 with respect to the temperature, but the conversion table 6 may be constructed to correct only for one or the other of these variations. A feature of the present invention lies in the simultaneous implementation of the above two measures.

Figure 3A:
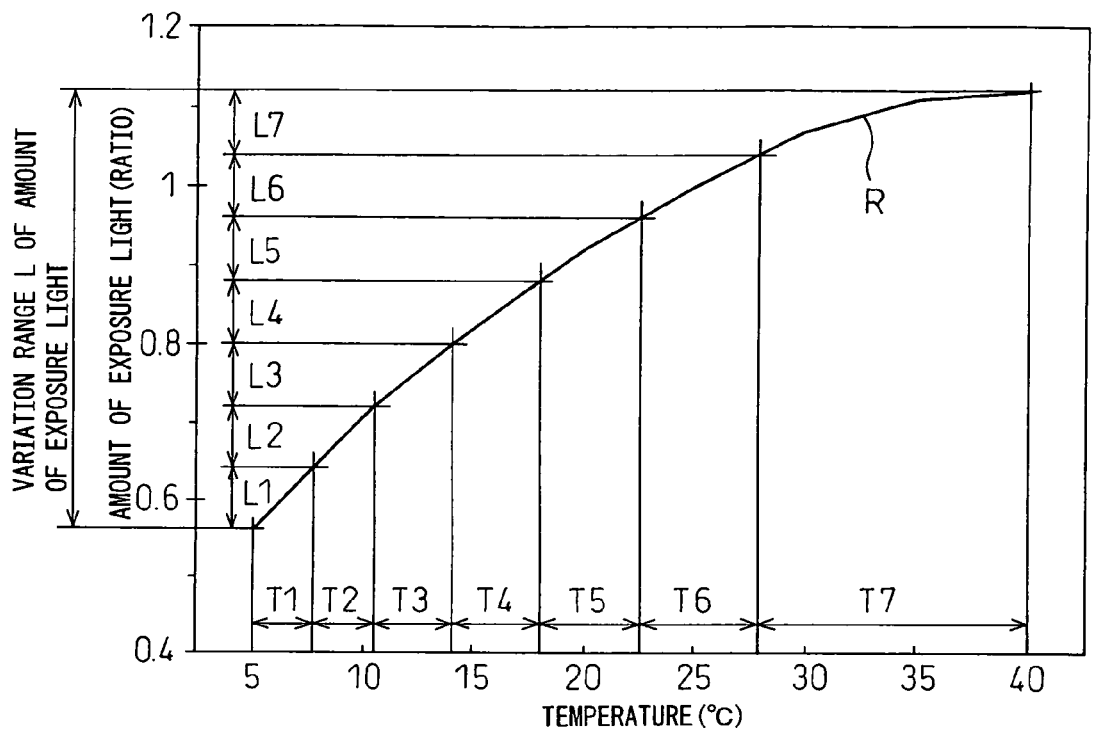
FIG. 3A is a characteristic diagram illustrating a method for equally dividing a conversion table in terms of the variation range over which the amount of exposure light varies with ambient temperature.

FIG. 3A shows one example of a method for switching the conversion table 6 from one to another for use as the converting means.

In the method shown in FIG. 3A, the variation range of the amount of exposure light is divided into equal regions each of which is covered by one of the conversion tables—6a to 6g. The curve R shown in FIG. 3A corresponds to the amount of exposure light versus temperature characteristic for R shown in FIG. 2B. The X and Y axes in FIG. 3A represent the temperature and the ratio of the amount of exposure light, respectively, as in FIG. 2B. In the example shown here, the variation range L over which the amount of exposure light varies when the ambient temperature varies from 5° C. to 40° C. is divided into seven equal regions, and these regions (L1 to L7) are mapped onto the curve R to divide the temperature range into the corresponding temperature regions T1 to T7.

In this switching method, as shown, the temperature range is divided into the regions T1 to T7 of widely varying width, but the variation range L of the amount of exposure light is divided into regions of equal width. That is, the temperature range is divided such that the width of each temperature region is narrow in the low temperature range but is wide in the high temperature range. Here, the conversion tables 6a to 6g are sequentially switched so as to cover the respective temperature regions T1 to T7.

Figure 4:
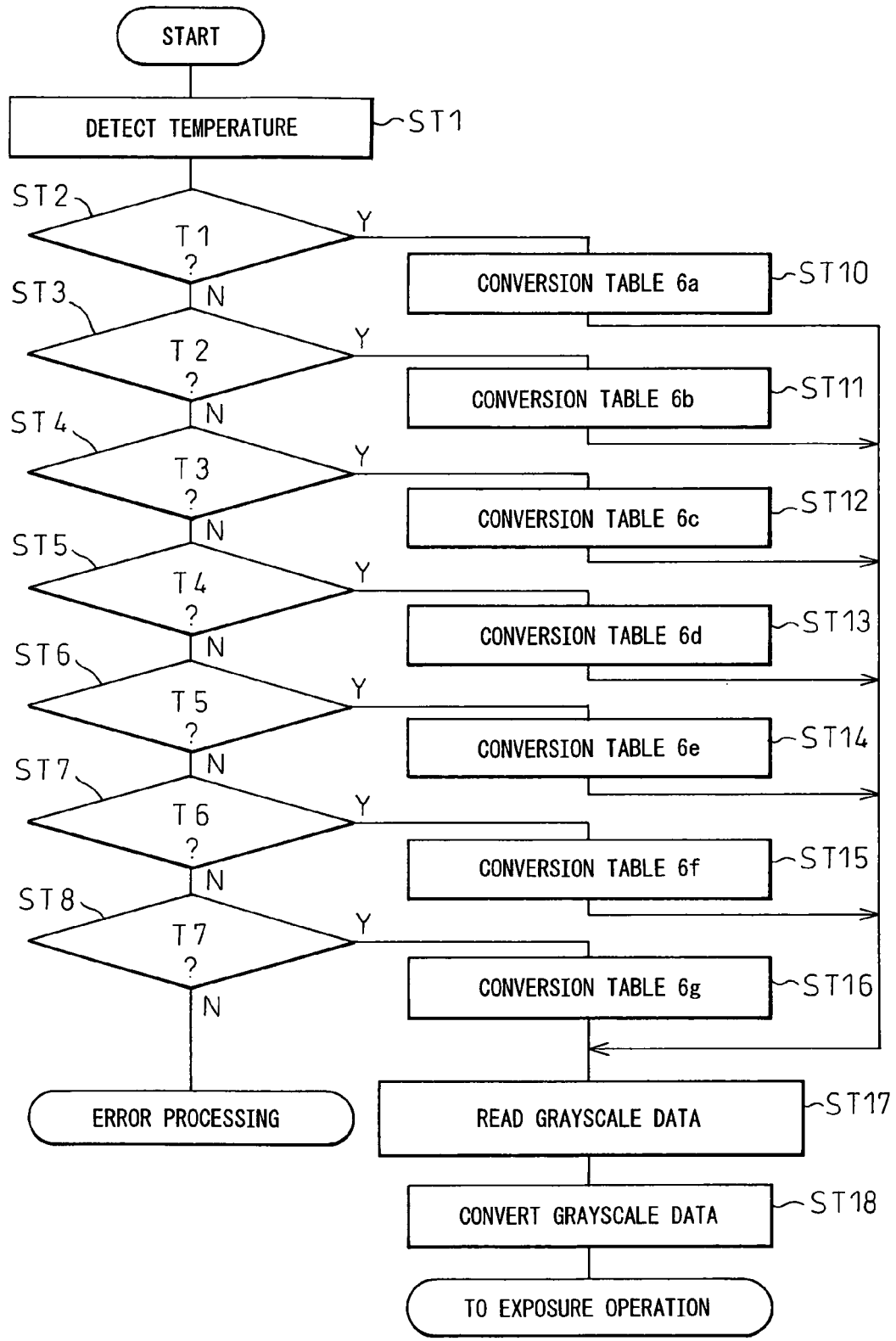
FIG. 4 is a flowchart for explaining a conversion table switching operation.

FIG. 4 shows a flowchart for explaining the conversion table switching operation when the switching method shown in FIG. 3A is used.

The microcomputer 2 for controlling the exposure apparatus 1 executes the conversion table switching mode as a preparatory step prior to the execution of the print operation. First, the microcomputer 2 receives the temperature data P1 from the temperature detector 3 (ST1). The temperature data P1 is an analog signal which, when input to the microcomputer 2, is converted into digital data by the built-in A/D converter (not shown) and stored in internal memory as the ambient temperature data of the exposure apparatus 1.

Next, the microcomputer 2 checks the stored temperature data to see if the temperature lies within the preset temperature range T1 (corresponding to the region T1 shown in FIG. 3A) (ST2). If the answer is yes, the process proceeds to ST10, but if no, the process proceeds to ST3.

If the answer to the decision in step ST2 is yes, this means that the ambient temperature of the exposure apparatus 1 lies within the temperature range T1; therefore, the microcomputer 2 selects the conversion table 6a corresponding to the temperature range T1, and outputs the select data P5 that specifies the conversion table 6a. The selector circuit 13 receives the select data P5 and outputs the select signal P11 for selecting the conversion table 6a (ST10). After carrying out ST10, the process proceeds to ST17.

On the other hand, if the answer to the decision in ST2 is no, the microcomputer 2 then checks to see if the temperature indicated by the stored temperature data lies within the preset temperature range T2 (corresponding to the region T2 shown in FIG. 3A) (ST3). If the answer here is yes, the process proceeds to ST11, but if no, the process proceeds to ST4.

If the answer to the decision in ST3 is yes, this means that the ambient temperature of the exposure apparatus 1 lies within the temperature range T2; therefore, the microcomputer 2 selects the conversion table 6b corresponding to the temperature range T2, and outputs the select data P5 that specifies the conversion table 6b. The selector circuit 13 receives the select data P5 and outputs the select signal P11 for selecting the conversion table 6b (ST11). After carrying out ST11, the process proceeds to ST17.

On the other hand, if the answer to the decision in ST3 is no, the microcomputer 2 then checks to see if the temperature indicated by the stored temperature data lies within the preset temperature range T3 (corresponding to the region T3 shown in FIG. 3A) (ST4). If the answer here is yes, the process proceeds to ST12, but if no, the process proceeds to ST5.

If the answer to the decision in ST4 is yes, this means that the ambient temperature of the exposure apparatus 1 lies within the temperature range T3; therefore, the microcomputer 2 selects the conversion table 6c corresponding to the temperature range T3, and outputs the select data P5 that specifies the conversion table 6c. The selector circuit 13 receives the select data P5 and outputs the select signal P11 for selecting the conversion table 6c (ST12). After carrying out ST12, the process proceeds to ST17.

On the other hand, if the answer to the decision in ST4 is no, the microcomputer 2 then checks to see if the temperature indicated by the stored temperature data lies within the preset temperature range T4 (corresponding to the region T4 shown in FIG. 3A) (ST5). If the answer here is yes, the process proceeds to ST13, but if no, the process proceeds to ST6.

If the answer to the decision in ST5 is yes, this means that the ambient temperature of the exposure apparatus 1 lies within the temperature range T4; therefore, the microcomputer 2 selects the conversion table 6d corresponding to the temperature range T4, and outputs the select data P5 that specifies the conversion table 6d. The selector circuit 13 receives the select data P5 and outputs the select signal P11 for selecting the conversion table 6d (ST13). After carrying out ST13, the process proceeds to ST17.

On the other hand, if the answer to the decision in ST5 is no, the microcomputer 2 then checks to see if the temperature indicated by the stored temperature data lies within the preset temperature range T5 (corresponding to the region T5 shown in FIG. 3A) (ST6). If the answer here is yes, the process proceeds to ST14, but if no, the process proceeds to ST7.

If the answer to the decision in ST6 is yes, this means that the ambient temperature of the exposure apparatus 1 lies within the temperature range T5; therefore, the microcomputer 2 selects the conversion table 6e corresponding to the temperature range T5, and outputs the select data P5 that specifies the conversion table 6e. The selector circuit 13 receives the select data P5 and outputs the select signal P11 for selecting the conversion table 6e (ST14). After carrying out ST14, the process proceeds to ST17.

On the other hand, if the answer to the decision in ST6 is no, the microcomputer 2 then checks to see if the temperature indicated by the stored temperature data lies within the preset temperature range T6 (corresponding to the region T6 shown in FIG. 3A) (ST7). If the answer here is yes, the process proceeds to ST15, but if no, the process proceeds to ST8.

If the answer to the decision in ST7 is yes, this means that the ambient temperature of the exposure apparatus 1 lies within the temperature range T6; therefore, the microcomputer 2 selects the conversion table 6f corresponding to the temperature range T6, and outputs the select data P5 that specifies the conversion table 6f. The selector circuit 13 receives the select data P5 and outputs the select signal P11 for selecting the conversion table 6f (ST15). After carrying out ST15, the process proceeds to ST17.

On the other hand, if the answer to the decision in ST7 is no, the microcomputer 2 then checks to see if the temperature indicated by the stored temperature data lies within the preset temperature range T7 (corresponding to the region T7 shown in FIG. 3A) (ST8). If the answer here is yes, the process proceeds to ST16, but if no, the process proceeds to error processing.

If the answer to the decision in ST8 is yes, this means that the ambient temperature of the exposure apparatus 1 lies within the temperature range T7; therefore, the microcomputer 2 selects the conversion table 6g corresponding to the temperature range T7, and outputs the select data P5 that specifies the conversion table 6g. The selector circuit 13 receives the select data P5 and outputs the select signal P11 for selecting the conversion table 6g (ST16). After carrying out ST16, the process proceeds to ST17.

On the other hand, if the answer to the decision in ST8 is no, this means that the ambient temperature of the exposure apparatus 1 is outside the operating temperature range; therefore, an error indication is produced, and the print operation is aborted (error processing). It will, however, be appreciated that this error processing operation may be modified as desired.

When the operation for selecting the conversion table 6 is completed, the microcomputer 2 outputs the memory control signal P3, under the control of which the image data stored in the memory 5 is sequentially output as the grayscale data P4 one line at a time for each of the R, G, and B data (ST17).

Next, using the conversion table selected by the selector circuit 13 from among the conversion tables 6a to 6g, the conversion table 6 converts the grayscale data P4 into the corrected grayscale data P6, and transfers the corrected grayscale data P6 to the LCS driving circuit 7 (ST18). The LCS driving circuit 7 successively exposes the photosensitive material 10 by driving the LCS 9a based on the corrected grayscale data P6. The operation thereafter has already been described, and the description will not be repeated here.

In the method that switches the conversion table between the conversion tables 6a to 6g by equally dividing the variation range L of the amount of exposure light as described above, as the range of the amount of exposure light to be covered by each conversion table is equal in width whichever one of the conversion tables 6a to 6g is selected in accordance with the temperature region, the amount of error contained in the correction amount is equal whichever conversion table is selected, and besides, the amount of error can be reduced. Furthermore, as the number of divisions can be reduced in a region where the change of the amount of exposure light is small (that is, in the high temperature region), the temperature range can be divided efficiently while reducing the number of divisions to a minimum, which serves to reduce the size of the conversion table 6.

Thus, according to the present invention, an exposure apparatus can be provided that can output a stable photographic quality image unaffected by variations in ambient temperature, by suppressing the effects of the temperature variations and achieving visually desirable grayscale reproduction. In particular, in the case of a portable type exposure apparatus that is often used in an outdoor environment, the effect of the present invention is enormous because such an exposure apparatus is susceptible to changes in the ambient temperature. In FIG. 3A, the method of dividing the conversion table 6 has been described by taking as an example the amount of exposure light versus temperature characteristic for R, but it will be appreciated that the conversion table 6 can be divided and the correction can be made in like manner for the case of the amount of exposure light versus temperature characteristic for G or B.

Figure 3B:
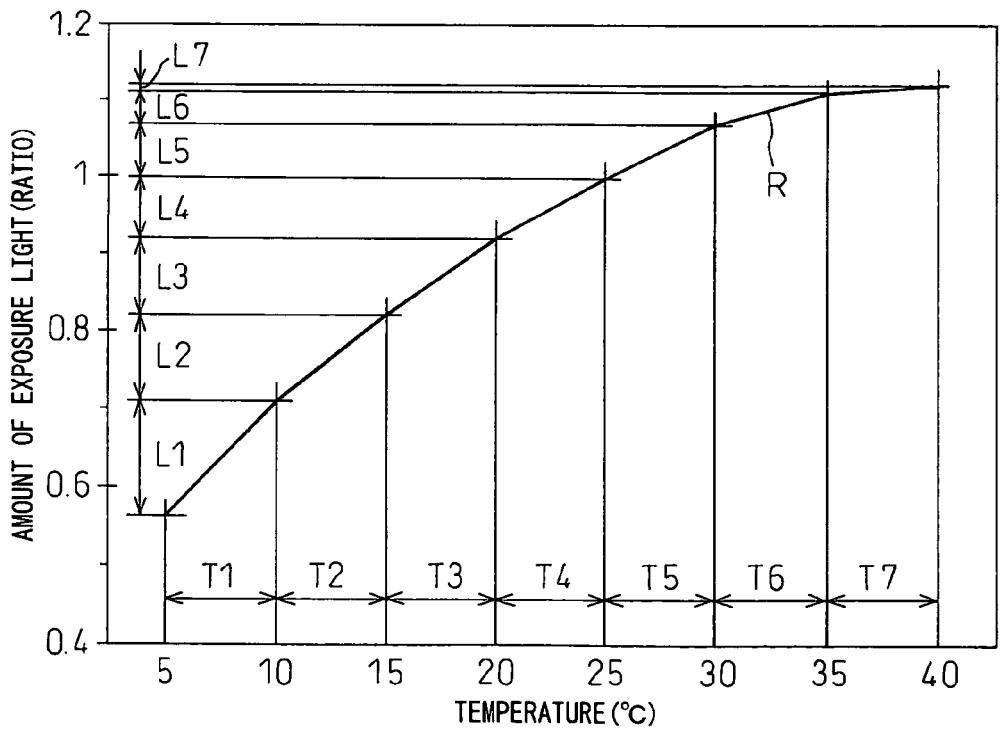
FIG. 3B is a characteristic diagram illustrating a method for equally dividing the conversion table in terms of the temperature range.

FIG. 3B shows another example of the method for switching the conversion table 6 from one to another for use as the converting means.

In the method shown in FIG. 3B, the temperature variation range is divided into equal regions each of which is covered by one of the conversion tables 6a to 6g. The curve R shown in FIG. 3B corresponds to the amount of exposure light versus temperature characteristic for R shown in FIG. 2B. The X and Y axes in FIG. 3B represent the temperature and the ratio of the amount of exposure light, respectively, as in FIG. 2B. In the example shown here, the ambient temperature range of 5° C. to 40° C. is divided into seven equal regions (T1 to T7), and these regions (T1 to T7) are mapped onto the curve R to divide the variation range of the amount of exposure light into the corresponding regions L1 to L7. As shown, the variation range of the amount of exposure light is divided into the regions L1 to L7 of widely varying width, but the temperature regions T1 to T7 are of equal width.

In this switching method, the conversion table 6 is sequentially switched so as to cover the respective temperature regions T1 to T7; here, the switching operation of the conversion table 6 is the same as that shown in the flowchart of FIG. 3A, and a description thereof will not be repeated here.

In the switching method that uses the conversion tables 6a to 6g by equally dividing the temperature variation range, as the range of the amount of exposure light that each selected one of the conversion tables 6a to 6g covers differs in width depending on the temperature, the amount of correction error also differs from one conversion table to another. For example, in the high temperature region, as the range of the amount of exposure light that the selected conversion table covers is narrow, the amount of correction error is extremely small, but in the low temperature region, as the range of the amount of exposure light that the selected conversion table covers is wide, the amount of correction error is relatively large. However, as the temperature range over which the conversion table 6 is switched from one to another is equally divided, the switching control of the conversion table 6 is simplified and the processing burden of the microcomputer 2 alleviated, contributing to the speedup of the print output, etc. In FIG. 3B, the method of dividing the conversion table 6 has been described by taking as an example the amount of exposure light versus temperature characteristic for R, but it will be appreciated that the conversion table 6 can be divided and the correction can be made in like manner for the case of the amount of exposure light versus temperature characteristic for G or B.

Figure 5:
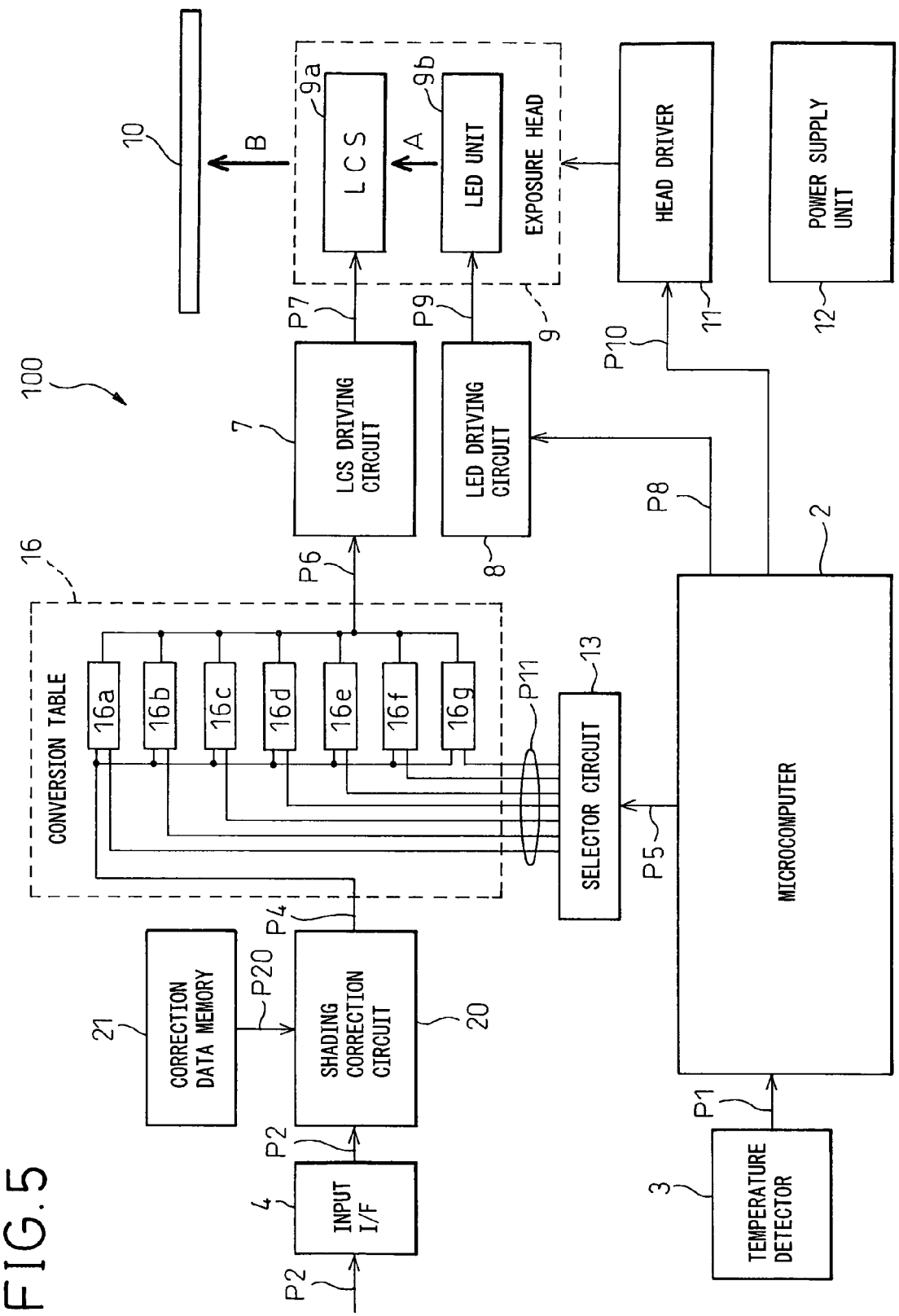
FIG. 5 is a circuit block diagram showing an overview of an exposure apparatus 100 according to the present invention.

FIG. 5 shows the configuration of another exposure apparatus 100 according to the present invention.

The same components as those in the exposure apparatus 1 shown in FIG. 1 are designated by the same reference numerals, and the description of such components will not be repeated here.

A shading correction circuit 20 as a light amount correcting means, which takes image data P2 as an input and outputs grayscale data P4, has the function of applying a correction to the input image data so that uniform illuminating light will emerge from the pixel array constituting the LCS to be described later. A correction data memory 21 stores correction data P3 computed from information concerning the variation in the amount of the illuminating light emerging from the pixel array constituting the LCS to be described later, and supplies the correction data P3 to the shading correction circuit 20.

A conversion table 16 as the converting means takes the grayscale data P4 as an input and converts the input grayscale data P4 into corrected grayscale data P6 which is output to correct the nonlinearity of exposure density. As shown, the conversion table 16 actually comprises a plurality of conversion tables; in the example shown here, the conversion table 16 consists of seven steps, i.e., the conversion tables 16a to 16g. The grayscale data P4 is input to the conversion tables 16a to 16g; then, an appropriate one of the conversion tables is selected under the control of a select signal P11 output from a selector circuit 13 as will be described later, and the selected conversion table outputs the corrected grayscale data P6. The grayscale data P4 is grayscale data comprising data of three primary colors of light, red (R), green (G), and blue (B), and the grayscale data P4 for each color usually consists of eight bits. Accordingly, the conversion table 16 comprises three different conversion tables, one for each of R, G, and B, to correspond with the grayscale data P4. More specifically, though not shown here, the actual conversion table 16 comprises three sets of conversion tables, one for each of R, G, and B, each set consisting of the plurality of conversion tables 16a to 16g.

As the grayscale data P4 is usually 8-bit data that can represent 256 grayscale levels, the conversion tables 16a to 16g are each constructed from corrected grayscale data P6 of 256 levels into which to convert the grayscale data P4. Here, the conversion table 16 is preferably constructed from a rewritable nonvolatile memory.

Next, an overview of the operation of the exposure apparatus 100 will be given below. When a power switch (not shown) on the exposure apparatus 100 is turned on to supply power from the power supply unit 12 to the respective blocks, the microcomputer 2 performs processing to initialize the respective blocks. During initialization, the head driver 11 moves the exposure head 9 into its home position, i.e., the standby position. Next, when an external device (for example, a digital camera) is connected to the input I/F 4, the microcomputer 2 controls the I/F 4 to sequentially input the image data P2 to the shading circuit 20. In the case of a digital camera or the like, often the image data is compressed data such as JPEG compressed data; in this case, the compressed data should be expanded by the mathematical function of the microcomputer 2 into uncompressed data that can be output for printing, and the uncompressed data should be input to the shading circuit 20. Further, the input image data P2 may be temporarily stored in a memory circuit such as a RAM not shown and, after storing the image data, for example, for one frame, the image data may be sequentially input to the shading circuit 20.

Next, based on the temperature data P1 supplied from the temperature detector 3, the microcomputer 2 outputs select data P5. The selector circuit 13 that received the select data P5 decodes it internally and outputs the select signal P11 to select an appropriate one of the plurality of conversion tables 16a to 16g contained in the conversion table 16. The operation for selecting the conversion table 16 will be described in detail later. Next, the shading circuit 20 applies a light amount correction to the input image data P2 based on the correction data P3 output from the correction data memory 21, and sequentially outputs the thus corrected grayscale data P4. The detailed operation of the shading circuit 20 will be described later. Next, the conversion table 16 nonlinearly corrects the input grayscale data P4 by using the selected one of the conversion tables 16a to 16g, and outputs the corrected grayscale data P6.

If, for example, the corrected grayscale data P6 from the conversion table 16 is output in the order of R, G, and B for each line; then, based on the corrected grayscale data P6, the LCS driving circuit 7 outputs the LCS drive signal P7 in the order of R, G, and B for each line. The LCS 9a performs the exposure operation by being driven by the LCS drive signal P7 in the order of R, G, and B for each line. That is, the LCS 9a achieves grayscale exposure by controlling the ON/OFF operation of each pixel based on the corrected grayscale data P6 and thereby varying the ON time of each pixel and thus varying the amount of exposure light to be projected onto the photosensitive material 10.

Here, as the grayscale data P4 input to the conversion table 16 is a signal to which the light amount correction has been applied by the shading correction circuit 20, the corrected grayscale data P6 output from the conversion table 16 to correct for the nonlinearity of exposure density is data on which the light amount correction applied by the shading correction circuit 20 is superimposed. Accordingly, the LCS 9a performs the exposure of the photosensitive material 10 by being driven in accordance with the corrected grayscale data P6 produced by superimposing the light amount correction on the exposure density nonlinearity correcting data.

The LED unit 9b sequentially turns on the three RGB LEDs (not shown) based on the LED drive signal P9 in synchronism with the operation of the LCS 9a. That is, when the LCS 9a is operating based on the corrected grayscale data P6 for R, the LED unit 9b turns on the R LED; when the LCS 9a is operating based on the corrected grayscale data P6 for G, the G LED is turned on; and when the LCS 9a is operating based on the corrected grayscale data P6 for B, the B LED is turned on. As a result, three colors of exposure light are overlaid one above another on the photosensitive material 10, achieving a full-color print.

When the RGB exposure operation for one line is completed, the grayscale data P4 for the second line is output from the shading correction circuit 20 in the order of R, G, and B; then, based on the grayscale data P4, the conversion table 16 outputs the corrected grayscale data P6 for the second line in the order of R, G, and B. The LCS 9a performs the exposure operation for the second line, again in the order of R, G, and B. The head driver 11, under the control of the head control signal P10 from the microcomputer 2, successively moves the exposure head 9 in synchronism with the exposure performed for each line, to accomplish exposure of the entire surface of the photosensitive material 10. When the exposures for all the lines are completed, the head driver 11 moves the exposure head 9 back into its home position to complete the print operation.

The amount of exposure light versus density characteristic of the photosensitive material 10 used in the exposure apparatus 100 and the temperature characteristic for each of the R, G, and B components of the illuminating light B output from the exposure head 9 are the same as those previously shown in FIGS. 2A and 2B, respectively, and therefore, the description thereof will not be repeated here.

As can be seen from the two characteristic diagrams previously shown in FIGS. 2A and 2B, the exposure apparatus 100 also requires measures similar to the two measures that the exposure apparatus 1 takes in order to achieve a visually desirable grayscale exposure based on the grayscale data P4.

Figure 6:
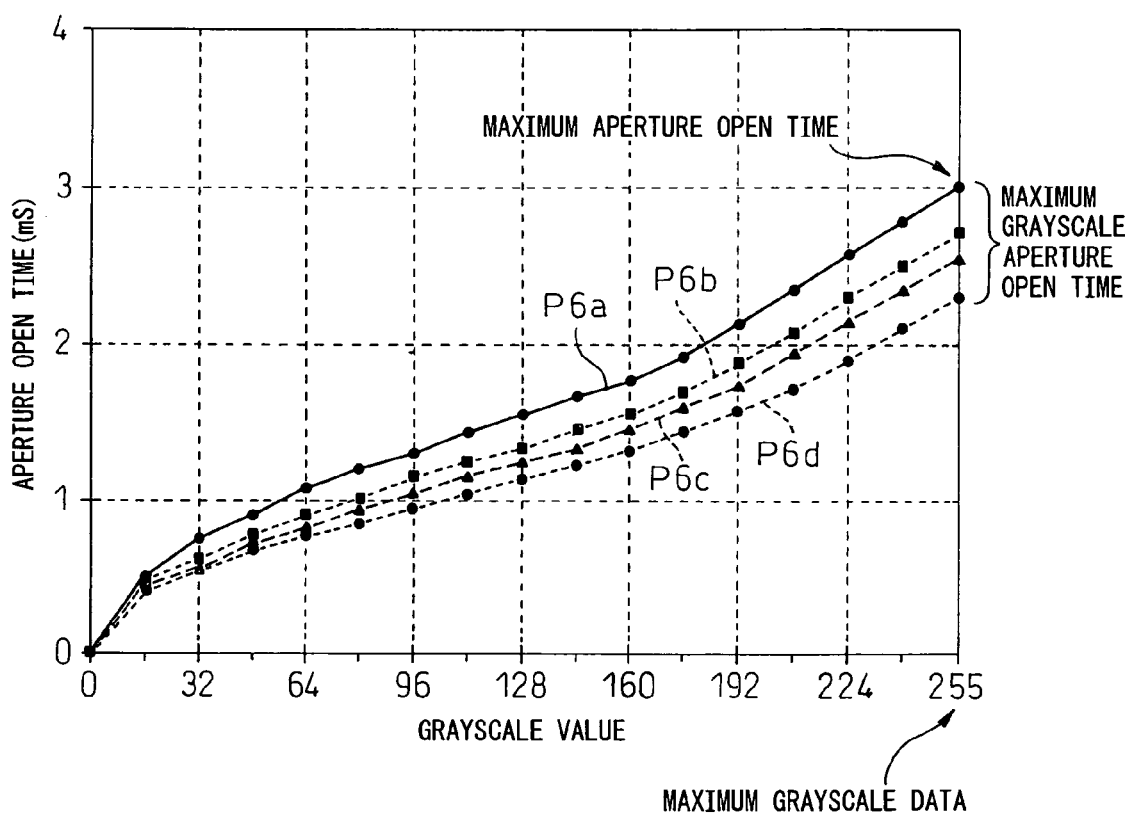
FIG. 6 is a conversion table input/output graph showing the relationship between the grayscale data input to the conversion table and the aperture open time output from the conversion table.

FIG. 6 shows one example of the corrected grayscale data output from the conversion table 16 in the exposure apparatus 100.

The conversion table 16 comprises the plurality of conversion tables 16a to 16g which are switched from one to another as the temperature changes, but for convenience of explanation, the following description is given by dealing with the corrected grayscale data P6 output from the conversion tables 16a to 16d which constitute part of the conversion table 16. In FIG. 6, the X axis represents the grayscale value of the grayscale data P4 input to the conversion table 16. Here, as the grayscale data P4 consists of eight bits, the grayscale value ranges from 0 to 255. The Y axis represents the aperture open time during which the LCS 9a allows the emergent light B to pass through it; the aperture open time is nothing but the value of the corrected grayscale data P6 output from the conversion table 16.

In FIG. 6, P6a shows the corrected grayscale data output from the conversion table 16a that is selected when the ambient temperature is around 6° C. which is near the lowest operating temperature of the exposure apparatus; P6b shows the corrected grayscale data output from the conversion table 16b that is selected when the ambient temperature is around 13.5° C.; P6c shows the corrected grayscale data output from the conversion table 16c that is selected when the ambient temperature is around 17° C.; and P6d shows the corrected grayscale data output from the conversion table 16d that is selected when the ambient temperature is around 25° C. The corrected grayscale data P6a to P6d are nonlinear with respect to the grayscale value, because these data are produced in order to correct for the nonlinear relationship between the grayscale data P4 and the amount of exposure light for the LCS and the nonlinear relationship between the amount of exposure light and the density for the photosensitive material, as previously described. Further, when the corrected grayscale data P6a is compared, for example, with the corrected grayscale data P6d, the aperture open time is shorter in the corrected grayscale data P6d; the reason for this is to correct for the temperature characteristic of the LCS 9a shown in FIG. 2B.

That is, in the low temperature region, as the amount of exposure light from the LCS 9a is small, the correction is made by increasing the aperture open time; conversely, in the high temperature region, as the amount of exposure light from the LCS 9a is large, the correction is made by reducing the aperture open time. Here, the aperture open time corresponding to the maximum grayscale data (i.e., 255) will be referred to as the maximum grayscale aperture open time. From the graph, the maximum grayscale aperture open times of the respective corrected grayscale data P6a to P6d are read as follows: the maximum grayscale aperture open time of the corrected grayscale data P6a is 3 mS, the maximum grayscale aperture open time of the corrected grayscale data P6b is 2.7 mS, the maximum grayscale aperture open time of the corrected grayscale data P6c is 2.55 mS, and the maximum grayscale aperture open time of the corrected grayscale data P6d is 2.3 mS. Here, of the maximum grayscale aperture open times, the longest maximum grayscale aperture open time, i.e., the maximum grayscale aperture open time (3 mS) of the corrected grayscale data P6a, is defined as the maximum aperture open time as shown.

The switching operation of the conversion table 16 will be described below. As previously described, the exposure apparatus 100 includes seven conversion tables 16a to 16g which are switched from one to another in accordance with the seven temperature ranges T1 to T7. Of the seven temperature ranges T1 to T7, T1 corresponds to the lowest temperature range, and T7 the highest temperature range. In the exposure apparatus 100, the conversion table switching operation is performed mostly under the control of the microcomputer 2; as the operation flow is the same as that shown in FIG. 4, except that the tables to be selected are the conversion tables 16a to 16g, the description of the flow will not be repeated here.

In the exposure apparatus 100 also, the method shown in FIG. 3A is employed, that is, the variation range of the amount of exposure light is divided into equal regions each of which is covered by one of the conversion tables 16a to 16g. That is, in the exposure apparatus 100 also, the variation range of the amount of exposure light is divided into substantially equal regions each corresponding to one temperature region to be covered.

FIG. 7 shows one example of exposure timing in the exposure apparatus 100.

Figure 7A:
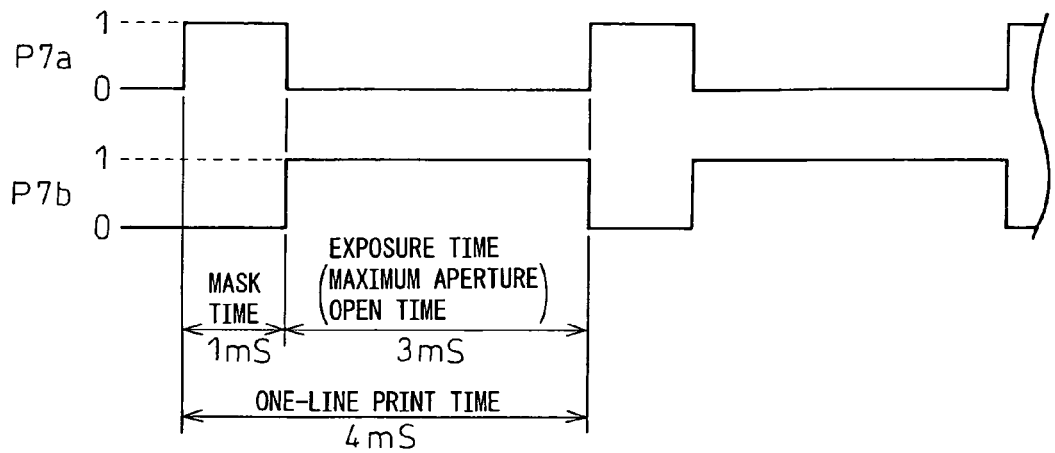
FIG. 7A is a timing chart for explaining the exposure operation of the exposure apparatus 100 at temperatures around 6° C.

In FIG. 7A, P7a is the mask signal included in the LCS drive signal P7, and P7b is the exposure signal included in the LCS drive signal P7. The logic "1" period of the mask signal P7a defines the mask time. The mask time is the period during which each pixel in the LCS 9a is reset by applying an OFF signal to the pixel and thus blocking the light. On the other hand, the logic "1" period of the exposure signal P7b defines the exposure time. Within the exposure time, each pixel in the LCS 9a is turned on in accordance with the aperture open time defined by the corrected grayscale data P6, allowing the light to transmit therethrough and thus outputting the illuminating light B. The sum of the mask time and the exposure time is the one-line print time required to expose the photosensitive material 10 for printing one line. Multiplying the one-line print time by the number of line exposures and further multiplying the result by three (because three exposures, one for each of R, G, and B, are needed) gives the print time required for printing an image of one frame. That is, if the one-line print time is constant, the print time required for the exposure of an image of one frame is also constant, and if the one-line print time varies, the print time for printing an image of one frame varies correspondingly.

Further, the exposure time must be set so as to cover the maximum grayscale aperture open time of the LCS 9a corresponding to the maximum grayscale data (grayscale value=255) of the grayscale data P4. The reason is that the ON time and OFF time of the LCS 9a are determined within this exposure time in accordance with the corrected grayscale data P6. For example, when the grayscale value is 0, the ON time of the LCS 9*a* is 0 (that is, all OFF), and when the grayscale value is 255 which is the largest value, the ON time of the LCS 9*a* is equal to the maximum grayscale aperture open time.

FIG. 7A shows the exposure timing operation when the ambient temperature is around 6° C. As earlier described, when the ambient temperature is 6° C., the conversion table 16*a* is selected, and the exposure is performed using the corrected grayscale data P6*a* output from it. Here, as the maximum grayscale aperture open time of the corrected grayscale data P6*a* output from the selected conversion table 16*a* is 3 mS as shown in FIG. 6, the exposure time is thus set to 3 mS to cover this maximum grayscale aperture open time. As a result, if the mask time is, for example, 1 mS, the one-line print time is given as 3 mS+1 mS=4 mS. Here, the maximum grayscale aperture open time (i.e., 3 mS) of the corrected grayscale data P6*a* output from the conversion table 16*a* selected when the ambient temperature is around 6° C., which is near the lowest operating temperature of the exposure apparatus, is the longest aperture open time for the LCS 9*a*; therefore, this aperture open time is defined as the maximum aperture open time.

Figure 7B:
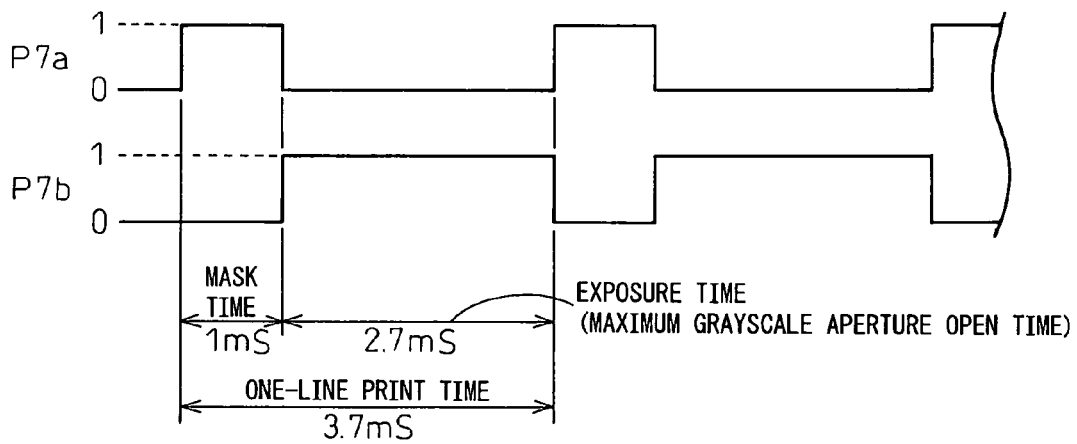
FIG. 7B is a timing chart for explaining the exposure operation of the exposure apparatus 100 at temperatures around 17° C.

FIG. 7B shows the exposure timing operation when the ambient temperature is around 17° C., that is, when the exposure is performed using the corrected grayscale data P6*c* shown in FIG. 6. In FIG. 7B, as the maximum grayscale aperture open time of the corrected grayscale data P6*c* corresponding to the maximum grayscale data is about 2.7 mS, as previously noted, the exposure time is thus set to 2.7 mS to cover this maximum grayscale aperture open time. As a result, if the mask time is 1 mS as in the case of FIG. 7A, the one-line print time is given as 2.7 mS+1 mS=3.7 mS.

Figure 7C:
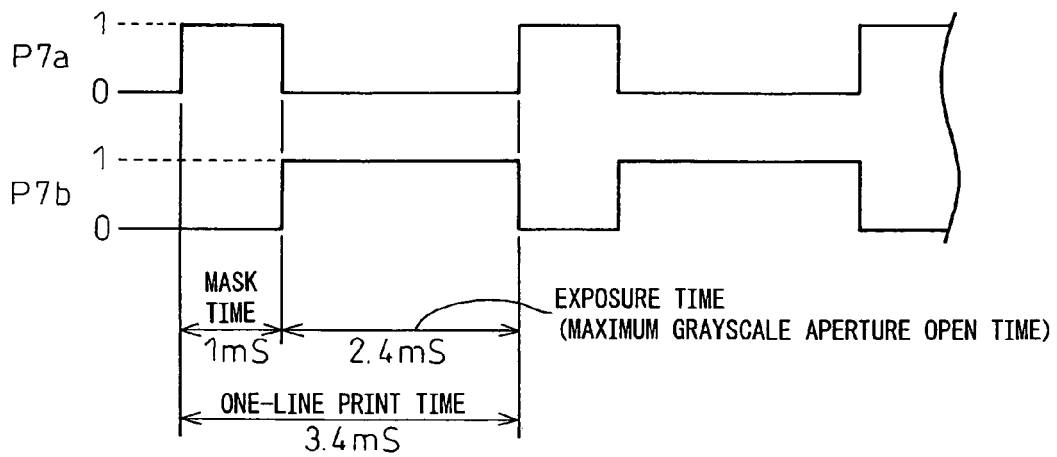
FIG. 7C is a timing chart for explaining the exposure operation of the exposure apparatus 100 at temperatures around 25° C.

FIG. 7C shows the exposure timing operation when the ambient temperature is around 25° C., that is, when the exposure is performed using the corrected grayscale data P6*d* shown in FIG. 6. In FIG. 7C, as the maximum grayscale aperture open time of the corrected grayscale data P6*d* corresponding to the maximum grayscale data is about 2.4 mS, as previously noted, the exposure time is thus set to 2.4 mS to cover this maximum grayscale aperture open time. As a result, if the mask time is 1 mS as in the case of FIG. 7A, the one-line print time is given as 2.4 mS+1 mS=3.4 mS.

That is, as is apparent from FIG. 7, when the exposure is performed using the corrected grayscale data P6*b* to P6*d*, as the maximum grayscale aperture open time differs from data to data, the one-line print time changes as the ambient temperature changes, and as a result, the print time per image changes. Accordingly, while the corrected grayscale data P6*b* to P6*d* are corrected grayscale data nearly optimum not only for correcting for the nonlinearities of the LCS and the photosensitive material but also for correcting for temperature variations, when these corrected data are used there arises the problem that the print time changes as the ambient temperature changes.

As described above, the exposure apparatus 100 has employed the method that switches the conversion table between the conversion tables 16*a* to 16*g* by equally dividing the variation range L of the amount of exposure light; the effect of this is that, as the range of the amount of exposure light to be covered by each conversion table is equal in width whichever one of the conversion tables 16*a* to 16*g* is selected in accordance with the temperature region, the amount of error contained in the correction amount is equal whichever conversion table is selected, and besides, the amount of error can be reduced. Furthermore, as the number of divisions can be reduced in a region where the change of the amount of exposure light is small (that is, in the high temperature region), the temperature range can be divided efficiently while reducing the number of divisions to a minimum, which serves to reduce the size of the conversion table 16.

Thus, according to the present invention, an exposure apparatus can be provided that can output a stable photographic quality image unaffected by variations in ambient temperature, by suppressing the effects of the temperature variations and achieving visually desirable grayscale reproduction. In particular, in the case of a portable type exposure apparatus that is often used in an outdoor environment, the effect of the present invention is enormous because such an exposure apparatus is susceptible to changes in the ambient temperature. In the above description, the method of dividing the conversion table 16 has been described by taking as an example the amount of exposure light versus temperature characteristic for R, but it will be appreciated that the conversion table 16 can be divided and the correction can be made in like manner for the case of the amount of exposure light versus temperature characteristic for G or B.

Figure 8:
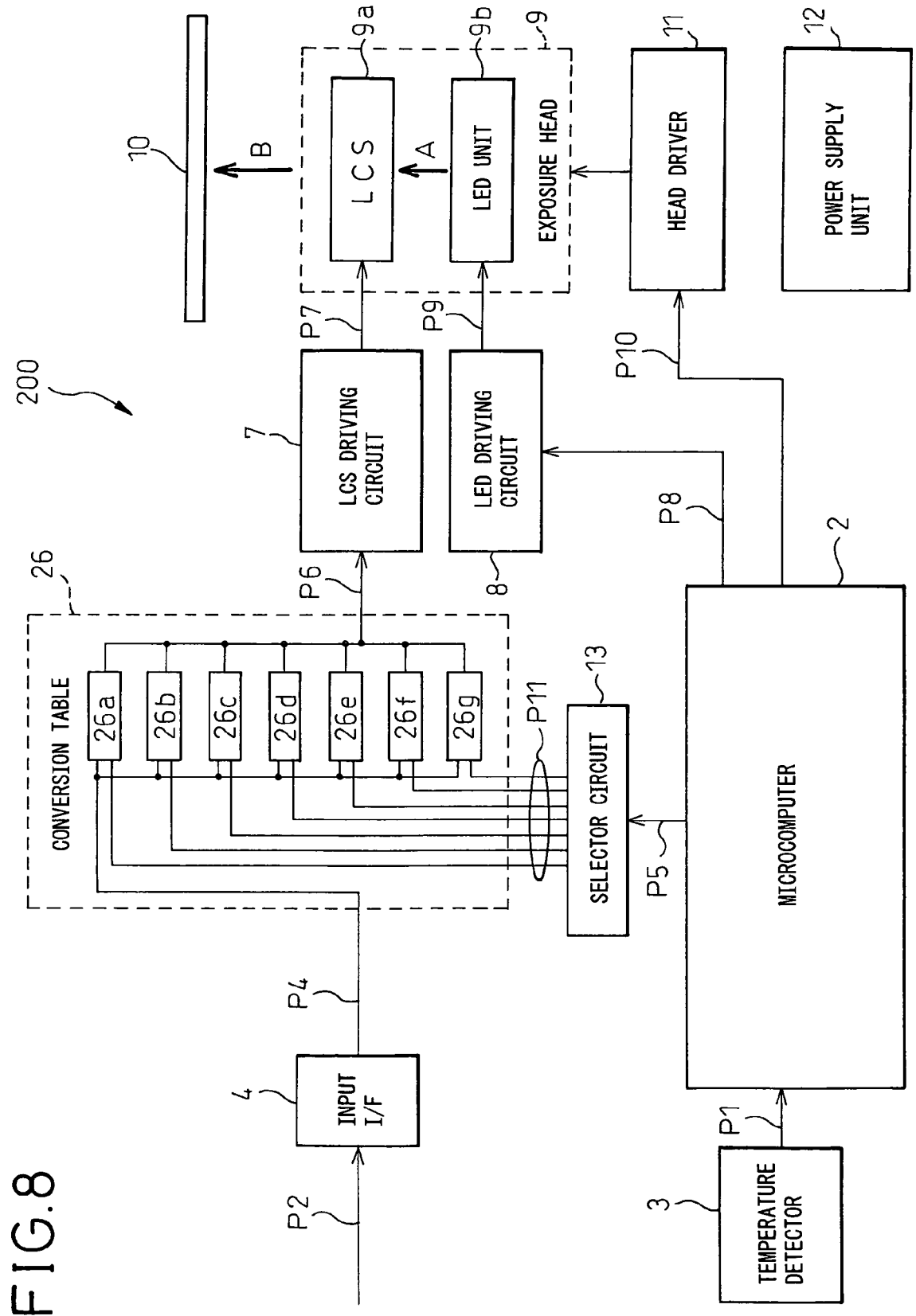
FIG. 8 is a circuit block diagram showing an overview of an exposure apparatus 200 according to the present invention.

FIG. 8 shows the configuration of still another exposure apparatus 200 according to the present invention.

The same components as those in the exposure apparatus 1 shown in FIG. 1 are designated by the same reference numerals, and the description of such components will not be repeated here.

As shown, a conversion table 26 comprises a plurality of conversion tables; in the example shown here, the conversion table 26 consists of seven steps, i.e., the conversion tables 26*a* to 26*g*. Grayscale data P4 is input to the conversion tables 26*a* to 26*g*; then, an appropriate one of the conversion tables is selected under the control of a select signal P11 output from a selector circuit 13 to be described later, and the selected conversion table outputs corrected grayscale data P6. The grayscale data P4 is grayscale data comprising data of three primary colors of light, red (R), green (G), and blue (B), and the grayscale data P4 for each color usually consists of eight bits. Accordingly, the conversion table 26 comprises three different conversion tables, one for each of R, G, and B, to correspond with the grayscale data P4. More specifically, though not shown here, the actual conversion table 26 comprises three sets of conversion tables, one for each of R, G, and B, each set consisting of the plurality of conversion tables 26*a* to 26*g*.

As the grayscale data P4 is usually 8-bit data that can represent 256 grayscale levels, the conversion tables 26*a* to 26*g* are each constructed from corrected grayscale data P6 of 256 levels into which to convert the grayscale data P4. Here, the conversion table 26 is preferably constructed from a rewritable nonvolatile memory.

Next, an overview of the operation of the exposure apparatus 200 will be given below. When a power switch (not shown) on the exposure apparatus 200 is turned on to supply power from the power supply unit 12 to the respective blocks, the microcomputer 2 performs processing to initialize the respective blocks. During initialization, the head driver 11 moves the exposure head 9 into its home position, i.e., the standby position. Next, when an external device (for example, a digital camera) is connected to the input I/F 4, the microcomputer 2 controls the I/F 4 to sequentially input the image data P2. In the case of a digital camera or the like, often the image data is compressed data such as JPEG compressed data; in this case, the grayscale data P4 output from the input I/F 4 should first be input to the microcomputer 2 and, after expanding the compressed data by the mathematical function of the microcomputer 2 into uncompressed data that can be output for printing, the uncompressed data should be input to the conversion table 26. Further, the input grayscale data P4 may be temporarily stored in a memory circuit, such as a RAM not shown, and, after storing the image data, for example, for one frame, the image data may be sequentially input to the conversion table 26.

Next, based on the temperature data P1 supplied from the temperature detector 3, the microcomputer 2 outputs select data P5. The selector circuit 13 that received the select data P5 decodes it internally and outputs the select signal P11 to select an appropriate one of the plurality of conversion tables 26a to 26g contained in the conversion table 26. The operation for selecting the conversion table 26 will be described in detail later. Next, the conversion table 26 nonlinearly corrects the input grayscale data P4 by using the selected one of the conversion tables 26a to 26g, and outputs the corrected grayscale data P6. If, for example, the corrected grayscale data P6 from the conversion table 26 is output in the order of R, G, and B for each line; then, based on the corrected grayscale data P6, the LCS driving circuit 7 outputs the LCS drive signal P7 in the order of R, G, and B for each line. The LCS 9a performs the exposure operation by being driven by the LCS drive signal P7 in the order of R, G, and B for each line. That is, the LCS 9a achieves grayscale exposure by controlling the ON/OFF operation of each pixel based on the corrected grayscale data P6 and thereby varying the ON time of each pixel and thus varying the amount of exposure light to be projected onto the photosensitive material 10.

The LED unit 9b sequentially turns on the three RGB LEDs (not shown) based on the LED drive signal P9 in synchronism with the operation of the LCS 9a. That is, when the LCS 9a is operating based on the corrected grayscale data P6 for R, the LED unit 9b turns on the R LED; when the LCS 9a is operating based on the corrected grayscale data P6 for G, the G LED is turned on; and when the LCS 9a is operating based on the corrected grayscale data P6 for B, the B LED is turned on. As a result, three colors of exposure light are overlaid one above another on the photosensitive material 10, achieving a full-color print.

When the RGB exposure operation for one line is completed, the grayscale data P4 for the second line is output from the input I/F 4 in the order of R, G, and B. Then, based on the grayscale data P4, the conversion table 26 outputs the corrected grayscale data P6 for the second line in the order of R, G, and B. The LCS 9a performs the exposure operation for the second line, again in the order of R, G, and B. The head driver 11, under the control of the head control signal P10 from the microcomputer 2, successively moves the exposure head 9 in synchronism with the exposure performed for each line, to accomplish the exposure of the entire surface of the photosensitive material 10. When the exposures for all the lines are completed, the head driver 11 moves the exposure head 9 back into its home position to complete the print operation.

The amount of exposure light versus density characteristic of the photosensitive material 10 used in the exposure apparatus 200 and the temperature characteristic for each of the R, G, and B components of the illuminating light B output from the exposure head 9 are the same as those previously shown in FIGS. 2A and 2B, respectively, and therefore, the description thereof will not be repeated here.

As can be seen from the two characteristic diagrams previously shown in FIGS. 2A and 2B, the exposure apparatus 200 also requires measures similar to the two measures that the exposure apparatus 1 has taken in order to achieve a visually desirable grayscale exposure based on the grayscale data P4.

The corrected grayscale data output from the conversion table 26 in the exposure apparatus 200 is the same as the corrected grayscale data output from the conversion table 16 in the exposure apparatus 100 shown in FIG. 6, and therefore, the description thereof will not be repeated here.

The switching operation of the conversion table 26 will be described below. As previously described, the exposure apparatus 200 includes seven conversion tables 26a to 26g which are switched from one to another in accordance with the seven temperature ranges T1 to T7. Of the seven temperature ranges T1 to T7, T1 corresponds to the lowest temperature range, and T7 the highest temperature range. In the exposure apparatus 200, the conversion table switching operation is performed mostly under the control of the microcomputer 2; as the operation flow is the same as that shown in FIG. 4, except that the tables to be selected are the conversion tables 26a to 26g, a description of the flow will not be repeated here.

In the exposure apparatus 200 also, the method shown in FIG. 3A is employed, that is, the variation range of the amount of exposure light is divided into equal regions each of which is covered by one of the conversion tables 26a to 26g. That is, in the exposure apparatus 200 also, the variation range of the amount of exposure light is divided into substantially equal regions each corresponding to one temperature region to be covered.

FIG. 9 shows one example of exposure timing in the exposure apparatus 200.

Figure 9A:
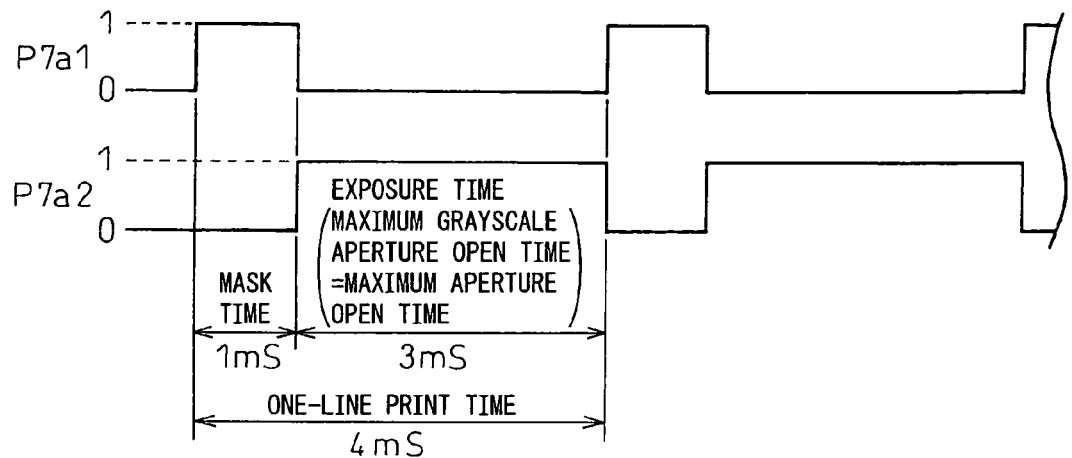
FIG. 9A is a timing chart for explaining the exposure operation of the exposure apparatus 200 at temperatures around 6° C.

FIG. 9A shows the exposure timing operation when the ambient temperature is around 6° C.; here, P7a1 is the mask signal included in the LCS drive signal P7, and P7a2 is the exposure signal included in the LCS drive signal P7. The logic "1" period of the mask signal P7a1 defines the mask time. The mask time is the period during which data is transferred to the LCS 9a based on the corrected grayscale data P6, and during which each pixel in the LCS 9a is reset by applying an OFF signal to the pixel and thus blocking the light. On the other hand, the logic "1" period of the exposure signal P7a2 defines the exposure time. Within the exposure time, each pixel in the LCS 9a is turned on in accordance with the aperture open time defined by the corrected grayscale data P6, allowing the light to transmit therethrough and thus outputting the illuminating light B. The sum of the mask time and the exposure time is the one-line print time required to expose the photosensitive material 10 for printing of one line. Multiplying the one-line print time by the number of line exposures and further multiplying the result by three, because three exposures, one for each of R, G, and B, are needed, gives the print time required for printing an image of one frame. That is, if the one-line print time is constant, the print time required for the exposure of an image of one frame is also constant, and if the one-line print time varies, the print time for printing an image of one frame varies correspondingly.

Further, the exposure time must be set so as to cover the maximum grayscale aperture open time of the LCS 9a corresponding to the maximum grayscale data (grayscale value=255) of the grayscale data P4. The reason is that the ON time and OFF time of the LCS 9a are determined within this exposure time in accordance with the corrected grayscale data P6. For example, when the grayscale value is 0, the ON time of the LCS 9a is 0 (that is, all OFF), and when the grayscale value is 255 which is the largest value, the ON time is equal to the maximum grayscale aperture open time. Here, FIG. 9A shows the exposure timing operation when the ambient temperature is around 6° C.; in this case, the conversion table 26a is selected, as earlier described, and the exposure is performed using the corrected grayscale data P6a output from it.

That is, as the maximum grayscale aperture open time of the corrected grayscale data P6a output from the selected conversion table 26a is 3 mS as previously shown in FIG. 6, the exposure time is thus set to 3 mS to cover this maximum grayscale aperture open time. As a result, the one-line print time becomes equal to the sum of the mask time and the maximum grayscale aperture open time. Here, if the mask time is, for example, 1 mS as shown in FIG. 9A, the one-line print time is given as the mask time (1 mS)+the maximum grayscale aperture open time (3 mS)=4 mS. As previously noted, the maximum grayscale aperture open time (i.e., 3 mS) of the corrected grayscale data P6a output from the selected conversion table 26a selected when the ambient temperature is around 6° C. near the lowest operating temperature of the exposure apparatus is the longest of all the maximum grayscale aperture open times; therefore, this aperture open time is defined as the maximum aperture open time.

Figure 9B:
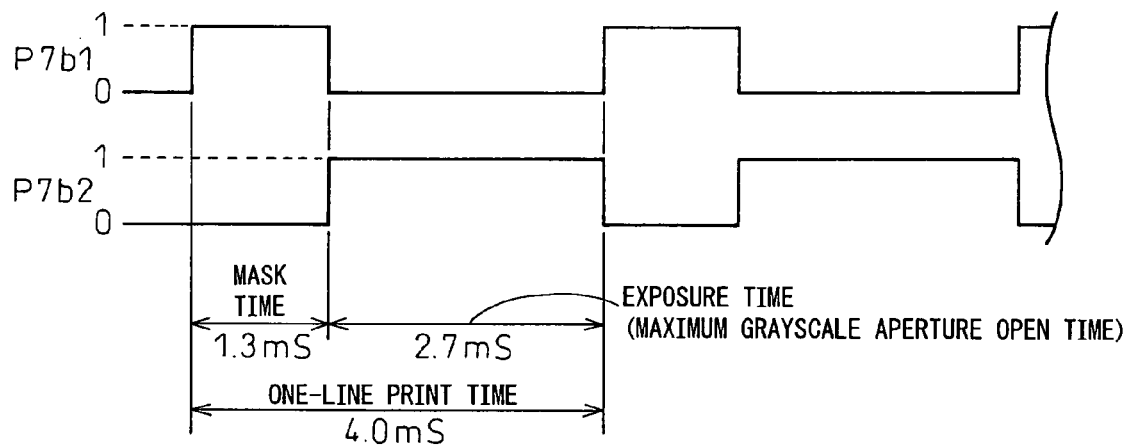
FIG. 9B is a timing chart for explaining the exposure operation of the exposure apparatus 200 at temperatures around 13.5° C.

FIG. 9B shows the exposure timing operation when the ambient temperature is around 13.5° C.; here, P7b1 is the mask signal included in the LCS drive signal P7, and P7b2 is the exposure signal included in the LCS drive signal P7. The maximum grayscale aperture open time of the corrected grayscale data P6b output from the conversion table 26b selected here is 2.7 mS as previously shown in FIG. 6; therefore, the exposure signal P7b2 provides an exposure time of 2.7 mS that covers this maximum grayscale aperture open time. That is, the maximum grayscale aperture open time defined by the exposure signal P7b2 when the ambient temperature is around 13.5° C. is shorter by 0.3 mS than the maximum grayscale aperture open time (i.e., the maximum aperture open time: 3 mS) defined by the exposure signal P7a2 when the ambient temperature is around 6° C. Here, to compensate for the reduced period of the exposure signal P7b2, the mask signal P7b1 is set to provide a mask time of 1.3 mS which is longer by 0.3 mS than the mask signal P7a1 when the ambient temperature is around 6° C. As a result, the one-line print time when the ambient temperature is around 13.5° C. is given as the mask time (1.3 mS)+the maximum grayscale aperture open time (2.7 mS)=4 mS which is equal to the one-line print time when the ambient temperature is around 6° C.

Figure 9C:
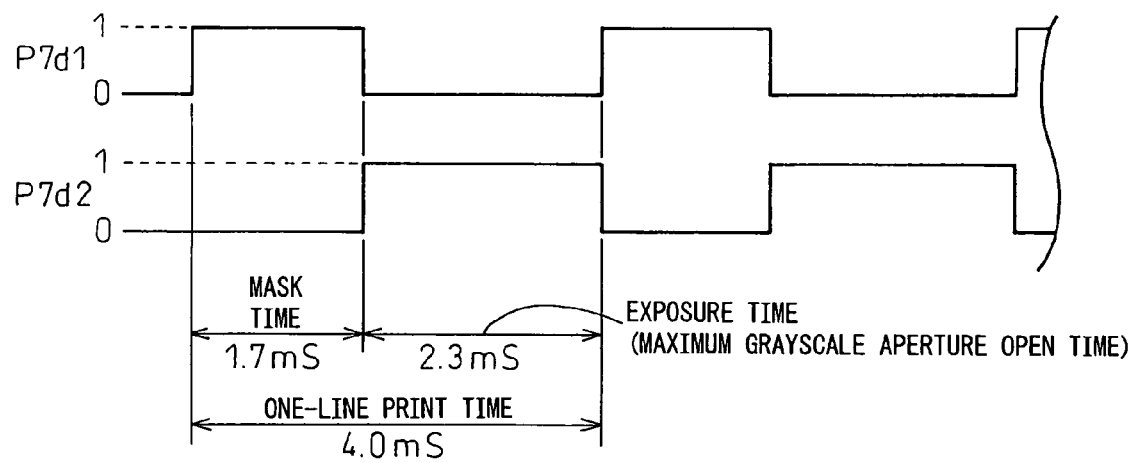
FIG. 9C is a timing chart for explaining the exposure operation of the exposure apparatus 200 at temperatures around 25° C.

FIG. 9C shows the exposure timing operation when the ambient temperature is around 25° C.; here, P7d1 is the mask signal included in the LCS drive signal P7, and P7d2 is the exposure signal included in the LCS drive signal P7. The maximum grayscale aperture open time of the corrected grayscale data P6d output from the conversion table 26d selected here is 2.3 mS as previously shown in FIG. 6; therefore, the exposure signal P7d2 provides an exposure time of 2.3 mS that covers this maximum grayscale aperture open time. That is, the maximum grayscale aperture open time defined by the exposure signal P7d2 when the ambient temperature is around 25° C. is shorter by 0.7 mS than the maximum grayscale aperture open time (i.e., the maximum aperture open time: 3 mS) defined by the exposure signal P7a2 when the ambient temperature is around 6° C. Here, to compensate for the reduced period of the exposure signal P7d2, the mask signal P7d1 is set to provide a mask time of 1.7 mS which is longer by 0.7 mS than the mask signal P7a1 when the ambient temperature is around 6° C. As a result, the one-line print time when the ambient temperature is around 25° C. is given as the mask time (1.7 mS)+the maximum grayscale aperture open time (2.3 mS)=4 mS which is equal to the one-line print time when the ambient temperature is around 6° C.

That is, the feature of the exposure apparatus 200 according to the present invention is that the differences in the maximum grayscale aperture open time that occur between the respective conversion tables when the conversion table 26 is switched from one to another are compensated for by varying the mask time so as to maintain the one-line print time constant despite the differences. FIG. 9 has shown only the LCS drive signals P7a, P7b, and P7d corresponding to the corrected grayscale data P6a, P6b, and P6d output from the respective conversion tables 26, but the above description also applies to the other LCS drive signals. All the LCS drive signals P7 are controlled so that the differences between the maximum grayscale aperture open times of the corrected grayscale signals P6 output from the respectively selected conversion tables 26 are compensated for by varying the mask time so as to maintain the one-line print time constant despite the differences. In this way, as the maximum grayscale aperture open time that differs depending on the selected conversion table 26 is adjusted by varying the mask time, the one-line print time can be maintained constant without changing the maximum grayscale aperture open time of the conversion table 26. The invention thus provides an exposure apparatus that can simplify the exposure control and can achieve constant print time at all times.

Another exposure apparatus 300 according to the present invention will be described below.

The feature of the exposure apparatus 300 is that a grayscale aperture close time is provided in addition to the maximum grayscale aperture open time in order to maintain the one-line print time constant without varying the mask time among the conversion tables 26a to 26g.

Figure 10:
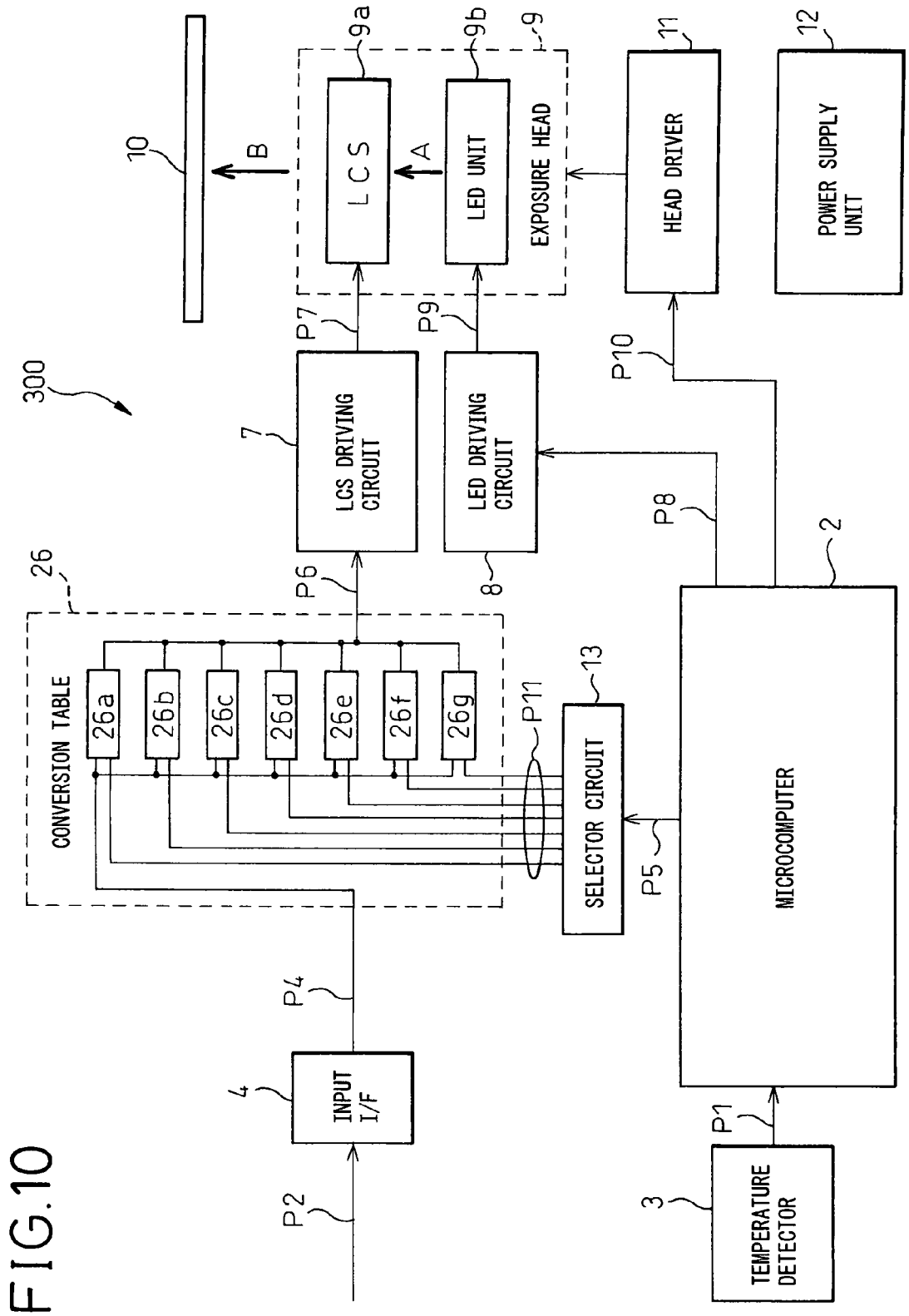
FIG. 10 is a circuit block diagram showing an overview of an exposure apparatus 300 according to the present invention.

FIG. 10 shows the configuration of the exposure apparatus 300. The basic configuration and operation of the exposure apparatus 300 is the same as that of the exposure apparatus 200, and therefore, the description thereof will not be repeated here.

In the exposure apparatus 300 also, the method shown in FIG. 3A is employed, that is, the variation range of the amount of exposure light is divided into equal regions each of which is covered by one of the conversion tables 26a to 26g. That is, in the exposure apparatus 300 also, the variation range of the amount of exposure light is divided into substantially equal regions each corresponding to one temperature region to be covered.

FIG. 11 shows one example of exposure timing in the exposure apparatus 300.

Figure 11A:
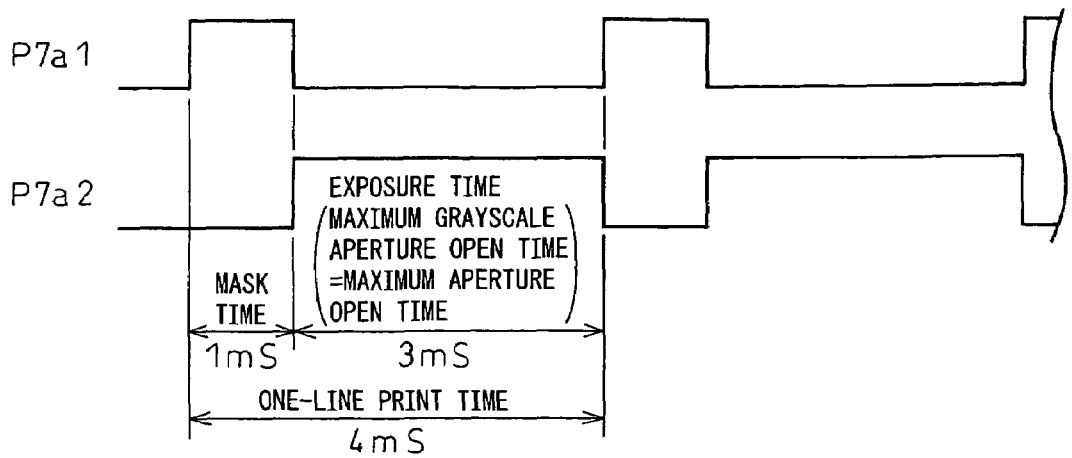
FIG. 11A is a timing chart for explaining the exposure operation of the exposure apparatus 300 at temperatures around 6° C.

FIG. 11A shows the exposure timing operation when the ambient temperature is around 6° C.; here, P7a1 is the mask signal included in the LCS drive signal P7, and P7a2 is the exposure signal included in the LCS drive signal P7. The exposure timing operation when the ambient temperature is around 6° C. is the same as that of the exposure apparatus 200 shown in FIG. 9A, and therefore, the description thereof will not be repeated here.

Figure 11B:
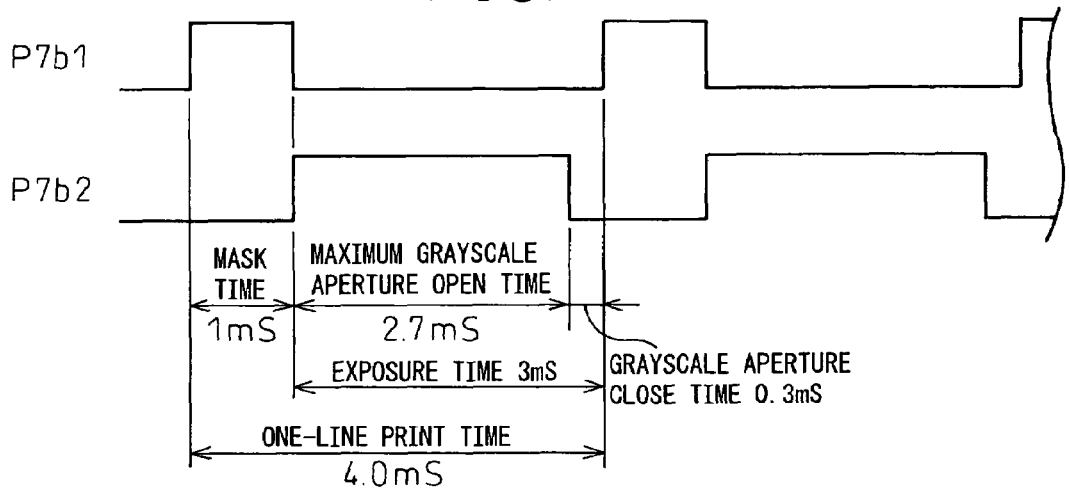
FIG. 11B is a timing chart for explaining the exposure operation of the exposure apparatus 300 at temperatures around 13.5° C.

FIG. 11B shows the exposure timing operation when the ambient temperature is around 13.5° C.; here, P7b1 is the mask signal included in the LCS drive signal P7, and P7b2 is the exposure signal included in the LCS drive signal P7. The maximum grayscale aperture open time of the corrected grayscale data P6b output from the conversion table 26b selected here is 2.7 mS as previously shown in FIG. 6. The exposure signal P7b2 supplied from the LCS driving circuit 7 here includes, after the maximum grayscale aperture open time, a grayscale aperture close time of 0.3 mS which is equal to the time difference between the maximum aperture open time (3 mS) and the maximum grayscale aperture open time (2.7 mS). That is, the exposure time defined by the exposure signal P7b2 is given as the sum of the maximum grayscale aperture open time of 2.7 mS and the grayscale aperture close time of 0.3 mS, thus making the exposure time equal to the exposure time (i.e., the maximum aperture open time: 3 mS) when the ambient temperature is around 6° C. On the other hand, the mask time defined by the mask signal P7b1 is set to 1 mS which is equal to the mask signal P7a1 when the ambient temperature is around 6° C. As a result, the one-line print time when the ambient temperature is around 13.5° C. is given as the mask time (1 mS)+the maximum grayscale aperture open time (2.7 mS)+the grayscale aperture close time (0.3 mS)=4 mS which is equal to the one-line print time when the ambient temperature is around 6° C. Here, the grayscale aperture close time may be placed before the maximum grayscale aperture open time. The grayscale aperture close time is the time during which the light is blocked by applying an OFF signal to each pixel in the LCS 9a.

Figure 11C:
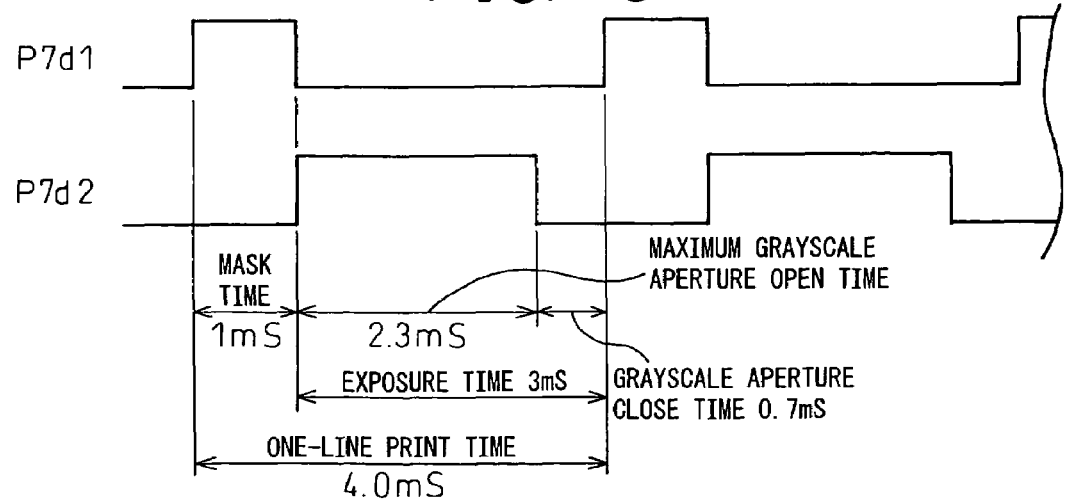
FIG. 11C is a timing chart for explaining the exposure operation of the exposure apparatus 300 at temperatures around 25° C.

FIG. 11C shows the exposure timing operation when the ambient temperature is around 25° C.; here, P7d1 is the mask signal included in the LCS drive signal P7, and P7d2 is the exposure signal included in the LCS drive signal P7. The maximum grayscale aperture open time of the corrected grayscale data P6d output from the conversion table 26d selected here is 2.3 mS as previously shown in FIG. 6. The exposure signal P7d2 supplied from the LCS driving circuit 7 here includes, after the maximum grayscale aperture open time, a grayscale aperture close time of 0.7 mS which is equal to the time difference between the maximum aperture open time (3 mS) and the maximum grayscale aperture open time (2.3 mS). That is, the exposure time defined by the exposure signal P7d2 is given as the sum of the maximum grayscale aperture open time of 2.3 mS and the grayscale aperture close time of 0.7 mS, thus making the exposure time equal to the exposure time (i.e., the maximum aperture open time: 3 mS) when the ambient temperature is around 6° C. On the other hand, the mask time defined by the mask signal P7d1 is set to 1 mS which is equal to the mask signal P7a1 when the ambient temperature is around 6° C. As a result, the one-line print time when the ambient temperature is around 25° C. is given as the mask time (1 mS)+the maximum grayscale aperture open time (2.3 mS)+the grayscale aperture close time (0.7 mS)=4 mS which is equal to the one-line print time when the ambient temperature is around 6° C. Here, the grayscale aperture close time may be placed before the maximum grayscale aperture open time.

FIG. 11 has shown only the LCS drive signals P7a, P7b, and P7d corresponding to the corrected grayscale data P6a, P6b, and P6d output from the respective conversion tables 26, but the above description also applies to the other LCS drive signals. All the LCS drive signals P7 are controlled so as to maintain the one-line print time constant by providing the grayscale aperture close time which is equal to the time difference between the maximum aperture open time (3 mS) and the maximum grayscale aperture open time of the corrected grayscale signal P6 output from the selected conversion table 26. In this way, as the maximum grayscale aperture open time that differs depending on the selected conversion table 26 is adjusted by adding the grayscale aperture close time, not only can the mask time be held constant, but the one-line print time can be maintained constant without changing the maximum grayscale aperture open time of the conversion table 26. The invention thus provides an exposure apparatus that can simplify the exposure control and can achieve constant print time at all times.

Still another exposure apparatus 400 according to the present invention will be described below.

The feature of the exposure apparatus 400 is that, while holding the mask time constant for all the conversion tables, the maximum grayscale aperture open time in each conversion table is set equal to the maximum aperture open time so as to maintain the one-line print time constant.

The same components as those in the exposure apparatus 1 shown in FIG. 1 are designated by the same reference numerals, and the description of such components will not be repeated here.

A shading correction circuit 20 as a light amount correcting means has the function of taking input image data P2 via the input I/F 4 and applying a correction to it so that uniform illuminating light B will emerge from the pixel array constituting the LCS 9a to be described later, and outputs grayscale data P4 as a result of the correction. A correction data memory 21 stores correction data P3 computed from information concerning the variation in the amount of the illuminating light B emerging from the pixel array constituting the LCS 9a to be described later, and supplies the correction data P3 to the shading correction circuit 20.

A conversion table 36 as the converting means takes the grayscale data P4 as an input from the shading correction circuit 20 and converts the input grayscale data P4 into corrected grayscale data P6 which is output to correct for the nonlinearity of exposure density. As shown, the conversion table 36 actually comprises a plurality of conversion tables; in the example shown here, the conversion table 36 consists of seven steps, i.e., the conversion tables 36a to 36g. The grayscale data P4 is input to the respective conversion tables 36a to 36g; then, an appropriate one of the conversion tables is selected under the control of the select signal P11 output from the selector circuit 13, and the selected conversion table outputs the corrected grayscale data P6.

Next, an overview of the operation of the exposure apparatus 400 according to the present invention will be given below.

When a power switch (not shown) on the exposure apparatus 400 is turned on to supply power from the power supply unit 12 to the respective blocks, the microcomputer 2 performs processing to initialize the respective blocks. During initialization, the head driver 11 moves the exposure head 9 into its home position, i.e., the standby position. Next, when an external device (for example, a digital camera) is connected to the input I/F 4, the microcomputer 2 controls the I/F 4 to sequentially input the image data P2 to the shading correction circuit 20. In the case of a digital camera or the like, often the image data is compressed data such as JPEG compressed data; in this case, the compressed data should be expanded by the mathematical function of the microcomputer 2 into uncompressed data that can be output for printing, and the uncompressed data should be input to the shading correction circuit 20. Further, the input image data P2 may be temporarily stored in a memory circuit such as a RAM not shown and, after storing the image data, for example, for one frame, the image data may be sequentially input to the shading correction circuit 20.

Next, based on the temperature data P1 supplied from the temperature detector 3, the microcomputer 2 outputs select data P5. The selector circuit 13 that received the select data P5 decodes it internally and outputs the select signal P11 to select an appropriate one of the plurality of conversion tables 36a to 36g contained in the conversion table 36. Next, the shading correction circuit 20 applies a light amount correction to the input image data P2 based on the correction data P20 output from the correction data memory 21, and sequentially outputs the corrected grayscale data P4. The detailed operation of the shading correction circuit 20 will be described later.

If, for example, the corrected grayscale data P6 from the conversion table 36 is output in the order of R, G, and B for each line; then, based on the corrected grayscale data P6, the LCS driving circuit 7 outputs the LCS drive signal P7 in the order of R, G, and B for each line. The LCS 9a performs the exposure operation by being driven by the LCS drive signal P7 in the order of R, G, and B for each line. That is, the LCS 9a achieves grayscale exposure by controlling the ON/OFF operation of each pixel based on the corrected grayscale data P6 and thereby varying the ON time of each pixel and thus varying the amount of exposure light to be projected onto the photosensitive material 10. Here, as the grayscale data P4 input to the conversion table 36 is a signal to which the light amount correction has been applied by the shading correction circuit 20, the corrected grayscale data P6 output from the conversion table 36 to correct for the nonlinearity of exposure density is data on which the light amount correction applied by the shading correction circuit 20 is superimposed. Accordingly, the LCS 9a performs the exposure of the photosensitive material 10 by being driven in accordance with the corrected grayscale data P6 produced by superimposing the light amount correction on the exposure density nonlinearity correcting data. The operation thereafter is the same as that of the previously described exposure apparatus 200 and, therefore, a description thereof will not be repeated here.

FIG. 13 shows one example of the corrected data P6 output from the conversion table 36 in the exposure apparatus 400.

The conversion table 36 comprises the plurality of conversion tables 36a to 36g which are switched from one to another as the temperature changes, but for convenience of explanation, the following description is given by dealing with the corrected grayscale data P6A to P6D output from the conversion tables 36a to 36d which constitute part of the conversion table 36.

Figure 13A:
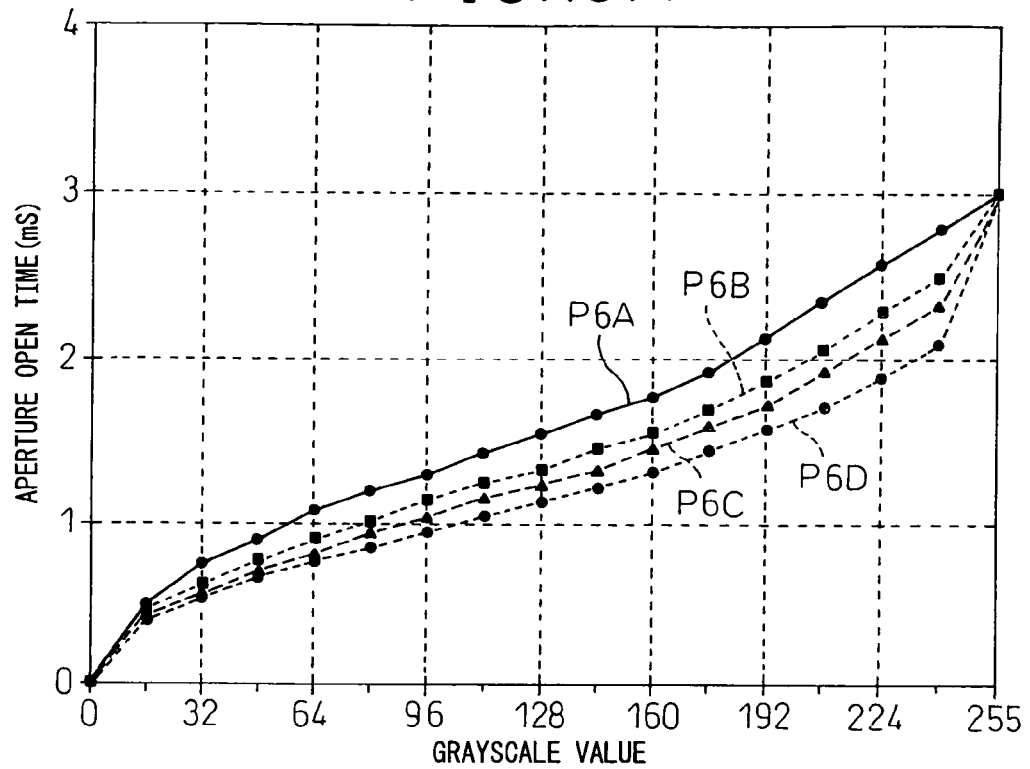
FIG. 13A is an input/output graph showing the relationship between the grayscale data input to the conversion table and the aperture open time output from the conversion table.

In FIG. 13A, the X axis represents the grayscale value of the grayscale data P4 input to the conversion table 36. Here, as the grayscale data P4 consists of eight bits, the grayscale value ranges from 0 to 255. The Y axis represents the aperture open time during which the LCS 9a allows the emergent light B to pass through it; the aperture open time is nothing but the value of the corrected grayscale data P6 output from the conversion table 36.

Here, P6A shows the corrected grayscale data output from the conversion table 36a that is selected when the ambient temperature is about 6° C. which is near the lowest operating temperature of the exposure apparatus 400; P6B shows the corrected grayscale data output from the conversion table 36b that is selected when the ambient temperature is about 13.5° C.; P6C shows the corrected grayscale data output from the conversion table 36c that is selected when the ambient temperature is about 17° C.; and P6D shows the corrected grayscale data output from the conversion table 36d that is selected when the ambient temperature is about 25° C. The corrected grayscale data P6A to P6D are nonlinear with respect to the grayscale value, because these data are produced in order to correct for the nonlinear relationship between the grayscale data P4 and the amount of exposure light for the LCS and the nonlinear relationship between the amount of exposure light and the density for the photosensitive material, as previously described. Further, when the corrected grayscale data P6A is compared, for example, with the corrected grayscale data P6D, the aperture open time is shorter in the corrected grayscale data P6D; the reason for this is to correct for the temperature characteristic of the LCS 9a shown in FIG. 6. That is, in the low temperature region, as the amount of exposure light from the LCS 9a is small, the correction is made by increasing the aperture open time; conversely, in the high temperature region, as the amount of exposure light from the LCS 9a is large, the correction is made by reducing the aperture open time.

In the exposure apparatus 400 also, the method shown in FIG. 3A is employed, that is, the variation range of the amount of exposure light is divided into equal regions each of which is covered by one of the conversion tables 36a to 36g. That is, in the exposure apparatus 400 also, the variation range of the amount of exposure light is divided into substantially equal regions each corresponding to one temperature region to be covered.

Figure 13B:
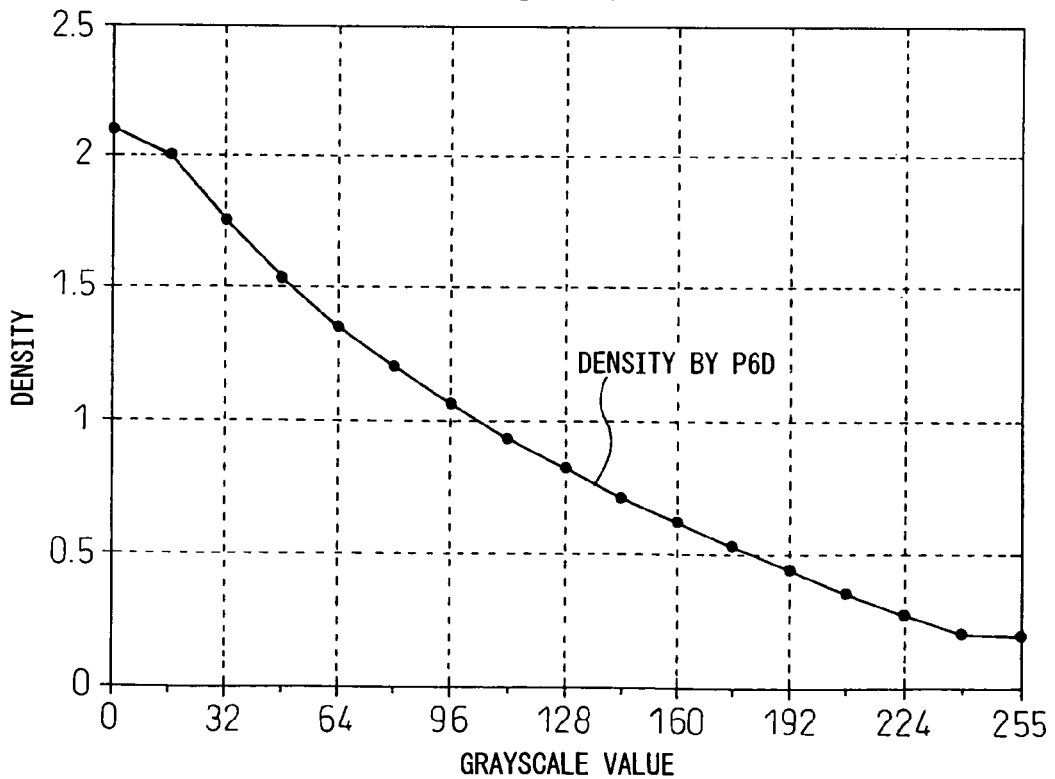
FIG. 13B is a diagram showing the relationship between the grayscale data input to the conversion table and the density on the photosensitive material.

Referring to FIG. 13B, a description will be given of one example of the relationship between the grayscale value and the density on the photosensitive material when the grayscale exposure is performed by using the corrected grayscale data P6D supplied from the conversion table 36d (i.e., the corrected grayscale data when the ambient temperature is 25° C.) shown in FIG. 13A. In FIG. 13B, the X axis represents the grayscale value of the grayscale data P4 input to the conversion table 36, and the Y axis represents the density on the photosensitive material. As shown, the density on the photosensitive material varies substantially linearly in regions (i.e., regions from about 16 to about 240) except the regions near the minimum and maximum values of the grayscale data P4. This is because the conversion table 36 has corrected the grayscale data P4 so that a substantially proper grayscale density can be achieved with respect to the grayscale data P4 by correcting for the nonlinear relationship between the grayscale data and the amount of exposure light for the LCS and the nonlinear relationship between the amount of exposure light and the density for the photosensitive material, as previously described.

Figure 14A:
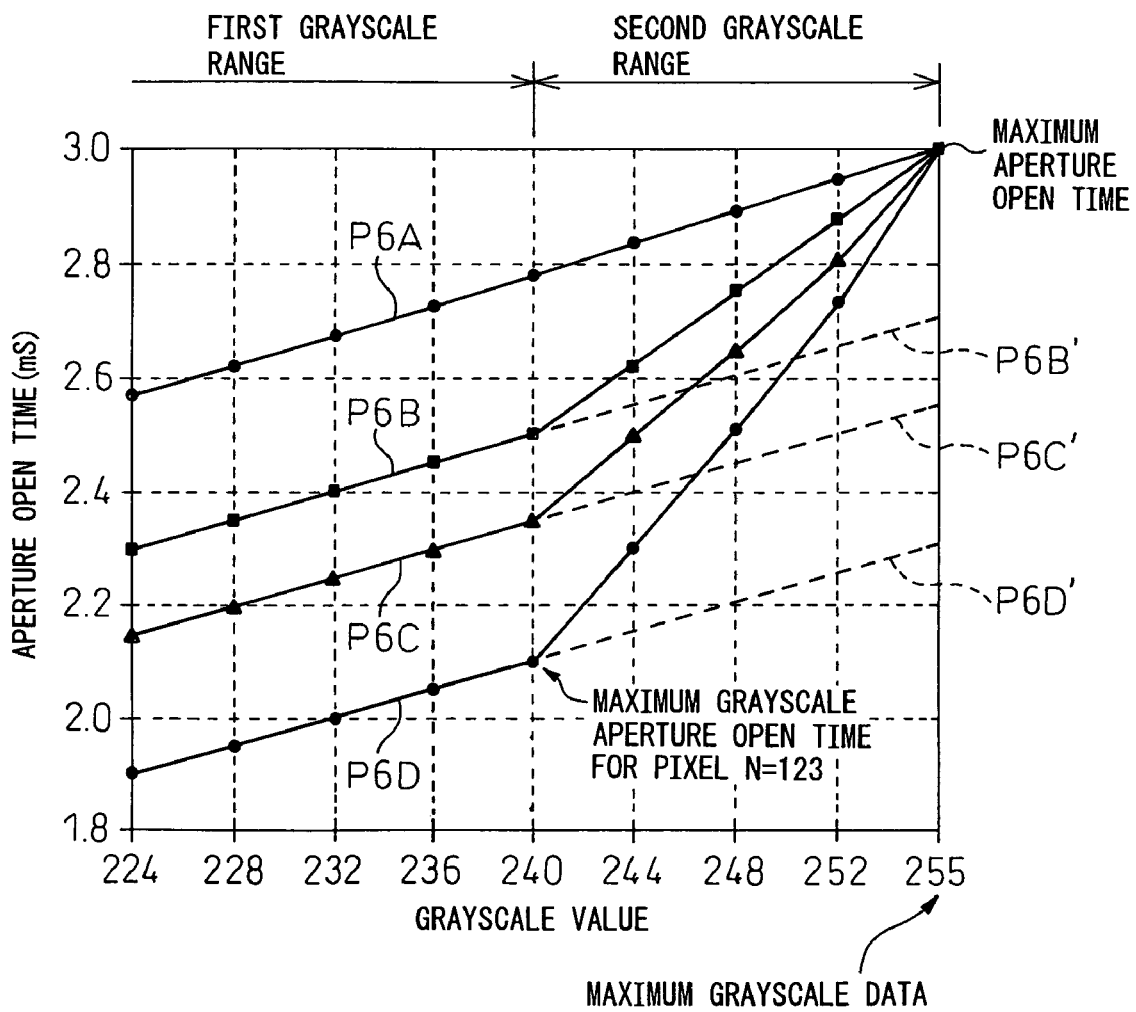
FIG. 14A is an enlarged view showing in enlarged form the grayscale data range of 224 to 255 shown in FIG. 13A.
Figure 14B:
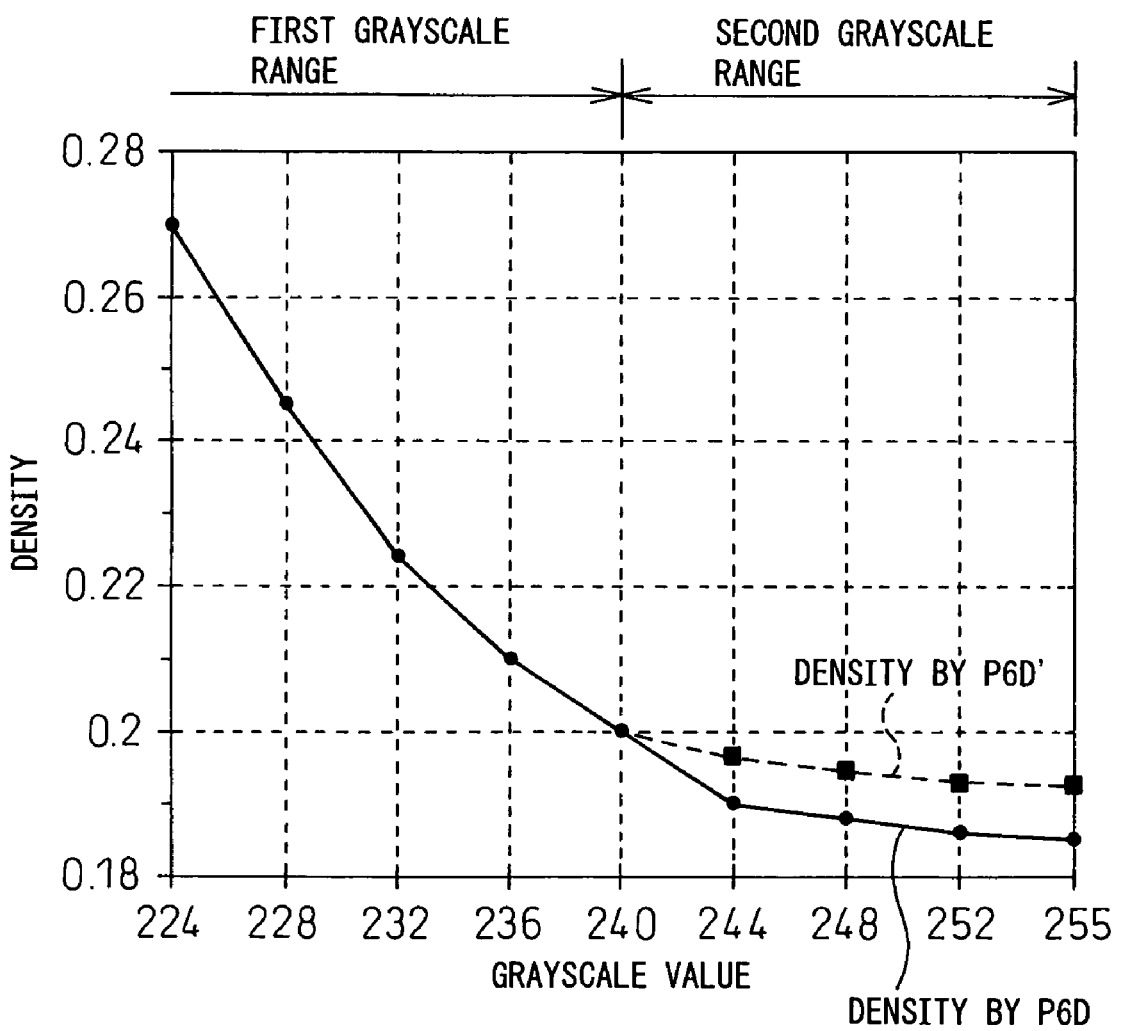
FIG. 14B is an enlarged view showing in enlarged form the grayscale data range of 224 to 255 shown in FIG. 13B.

FIG. 14 shows the relationship between the corrected grayscale data P6A to P6D and the density on the photosensitive material in the region near the upper limit of the grayscale data P4. FIG. 14A is an enlarged view of the region (the grayscale region from 224 to 255) near the upper limit of the grayscale data P4 shown in FIG. 13A, and FIG. 14B is an enlarged view of the region (the grayscale region from 224 to 255) near the upper limit of the grayscale data P4 shown in FIG. 13B.

In FIG. 14A, the corrected grayscale data P6A increases substantially linearly with the grayscale data P4, and the maximum grayscale aperture open time corresponding to the maximum grayscale data 255 of the grayscale data P4 is 3 mS. This maximum grayscale aperture open of the corrected grayscale data P6A is defined as the maximum aperture open time. In the region where the value of the grayscale data P4 is 240 or less, the corrected grayscale data P6B to P6D increase substantially parallel to each other, but in the region where the value of the grayscale data P4 is between 240 and 255, they converge as shown, and eventually each maximum grayscale aperture open time corresponding to the maximum grayscale data 255 of the grayscale data P4 becomes equal to the maximum aperture open time (3 mS).

Dashed lines P6B' to P6D' indicate imaginary corrected grayscale data which would be achieved if the corrected grayscale data P6B to P6D increased linearly and parallel to each other in the grayscale range of 240 to 255. The imaginary corrected grayscale data P6B' to P6D' are corrected grayscale data closer to the optimum for correcting for the nonlinearity with respect to the grayscale data P4 as well as for correcting for temperature variations. From FIG. 14A, the maximum grayscale aperture open time corresponding to the maximum grayscale data (grayscale value=255) of the grayscale data P4 is about 2.7 mS for the imaginary corrected grayscale data P6B', about 2.55 mS for the imaginary corrected grayscale data P6C', and about 2.3 mS for the imaginary corrected grayscale data P6D'.

Next, the difference between the density achieved when the grayscale exposure is performed using the corrected grayscale data P6D and the density achieved when the grayscale exposure is performed using the imaginary corrected grayscale data P6D' will be described by way of example with reference to FIG. 14B. In the exposure based on the corrected grayscale data P6D, as the slope of the aperture open time is rather steep in the grayscale range of 240 to 255, white density tends to become more or less intensified (that is, whiteout tends to become somewhat noticeable). On the other hand, in the exposure based on the imaginary corrected grayscale data P6D', as the slope of the aperture open time is substantially the same in the grayscale range of 240 to 255 as in the grayscale range of 240 or less, white density increases relatively naturally and whiteout is not noticeable. However, the grayscale data in the grayscale range where the grayscale value is large (240 to 255) does not affect the variation in the density of halftone portions that greatly affects the image quality; therefore, the actual difference between the image based on the corrected grayscale data P6D and the image based on the imaginary corrected grayscale data P6D' is small. Furthermore, as the tendency for the white density to become intensified is further reduced by the action of the shading correction circuit 20 as will be described later, the effects of the corrected grayscale data on the image quality are negligible in the exposure apparatus 400.

In FIG. 14, the region where the value of the grayscale data P4 is 240 or less corresponds to the first grayscale range where the relationship between the grayscale data P4 and the aperture open time of the LCS 9a substantially matches the grayscale density on the photosensitive material 10. On the other hand, the region where the value of the grayscale data P4 is from 240 to 255 corresponds to the second grayscale range where the relationship between the grayscale data P4 and the aperture open time of the LCS 9a does not match the grayscale density on the photosensitive material 10. The boundary between the first and second grayscale ranges is not limited to the above particular grayscale value, but can be determined appropriately in accordance with such factors as the characteristic of the LCS 9a and the characteristic of the photosensitive material 10 used. Further, the boundary between the first and second grayscale ranges may be set differently for each of the conversion tables 36a to 36g. In FIG. 13, the description has been given by dealing with the corrected grayscale data P6A to P6D output from the conversion tables 36a to 36d, but the above description also applies to the other conversion tables 36e to 36g. In the exposure apparatus 400, the maximum grayscale aperture open time in each of the conversion tables 36a to 36g is set equal to the maximum grayscale aperture open time (i.e., the maximum aperture open time) of the conversion table 36a.

FIG. 15 shows one example of the exposure timing operation of the exposure apparatus 400.

In FIG. 15A, P7a1 is the mask signal included in the LCS drive signal P7, and P7a2 is the exposure signal included in the LCS drive signal P7. The logic "1" period of the mask signal P7a1 defines the mask time. The mask time is the period during which data is transferred to the LCS 9a based on the corrected grayscale data P6, and during which each pixel in the LCS 9a is reset by applying an OFF signal to the pixel and thus blocking the light. On the other hand, the logic "1" period of the exposure signal P7a2 defines the exposure time. Within the exposure time, each pixel in the LCS 9a is turned on in accordance with the aperture open time defined by the corrected grayscale data P6, allowing the light to transmit therethrough and thus outputting the illuminating light B. The sum of the mask time and the exposure time is the one-line print time required to expose the photosensitive material 10 for printing one line. FIG. 15A shows the exposure timing operation when the ambient temperature is around 6° C., and the exposure timing is the same as that in the exposure apparatus 200 previously shown in FIG. 9A and, therefore, will not be described in detail here.

FIG. 15B shows the exposure timing operation when the ambient temperature is around 13.5° C. Here, P7b1 is the mask signal included in the LCS drive signal P7, and P7b2 is the exposure signal included in the LCS drive signal P7. The maximum grayscale aperture open time of the corrected grayscale data P6B output from the conversion table 36b selected here is 3 mS which is equal to the maximum aperture open time of the corrected grayscale data P6A, as previously shown in FIG. 14A; thus, the exposure time is set to 3 mS to cover this maximum grayscale aperture open time. As a result, if the mask time is, for example, 1 mS, the one-line print time is given as the mask time (1 mS)+the maximum grayscale aperture open time (3 mS)=4 mS. That is, the exposure timing operation at ambient temperatures around 13.5° C. where the conversion table 36b is selected is the same as the exposure timing operation at ambient temperatures around 6° C. where the conversion table 36a is selected, and the one-line print time is the same, i.e., 4 mS, for both. The 2.7-mS period shown by a dashed line indicates the maximum grayscale aperture open time of the imaginary corrected grayscale data P6B'. It can therefore be understood that, if the exposure timing were operated based on this imaginary corrected grayscale data P6B', the one-line print time would become shorter than that shown in FIG. 15A, thus causing the one-line print time to vary.

FIG. 15C shows the exposure timing operation when the ambient temperature is around 25° C. Here, P7d1 is the mask signal included in the LCS drive signal P7, and P7d2 is the exposure signal included in the LCS drive signal P7. The maximum grayscale aperture open time of the corrected grayscale data P6D output from the conversion table 36d selected here is 3 mS which is equal to the maximum aperture open time of the corrected grayscale data P6A, as previously shown in FIG. 14A; thus, the exposure time is set to 3 mS to cover this maximum grayscale aperture open time. As a result, if the mask time is, for example, 1 mS, the one-line print time is given as the mask time (1 mS)+the maximum grayscale aperture open time (3 mS)=4 mS. That is, the exposure timing operation at ambient temperatures around 25° C. where the conversion table 36d is selected is the same as the exposure timing operation at ambient temperatures around 6° C. where the conversion table 36a is selected, and the one-line print time is the same, i.e., 4 mS, for both. The 2.3-mS period shown by a dashed line indicates the maximum grayscale aperture open time of the imaginary corrected grayscale data P6D'. It can therefore be understood that, if the exposure timing were operated based on this imaginary corrected grayscale data P6D', the one-line print time would become shorter than that shown in FIG. 15B, thus causing the one-line print time to vary widely.

FIG. 15 has shown only the LCS drive signals P7a, P7b, and P7d corresponding to the corrected grayscale data P6A, P6B, and P6D output from the respective conversion tables 36, but the above description also applies to the other LCS drive signals to be selected. That is, as the maximum grayscale aperture open time of each of the corrected grayscale data P6A, P6B, and P6D is equal to the maximum aperture open time (i.e., 3 mS), the exposure timing operation performed based on each of the conversion tables 36a to 36g is identical to that shown in FIG. 15A, and the one-line print time is the same for all of them. As described above, according to the exposure apparatus 400 of the present invention, as the maximum grayscale open times of the corrected grayscale data P6A, P6B, and P6D output from the respective conversion tables 36a to 36g converge in the second grayscale range and are made equal to the maximum aperture open time, the exposure apparatus can maintain the print time constant even when the ambient temperature changes. Furthermore, as the mask time is constant, and as there is no need to provide an aperture closing time, the exposure apparatus of the invention can simplify the mask time control, exposure time control, etc. and can reduce the amount of circuitry of the microcomputer 2 and the LCS driving circuit, achieving a low-cost configuration.

Figure 16:
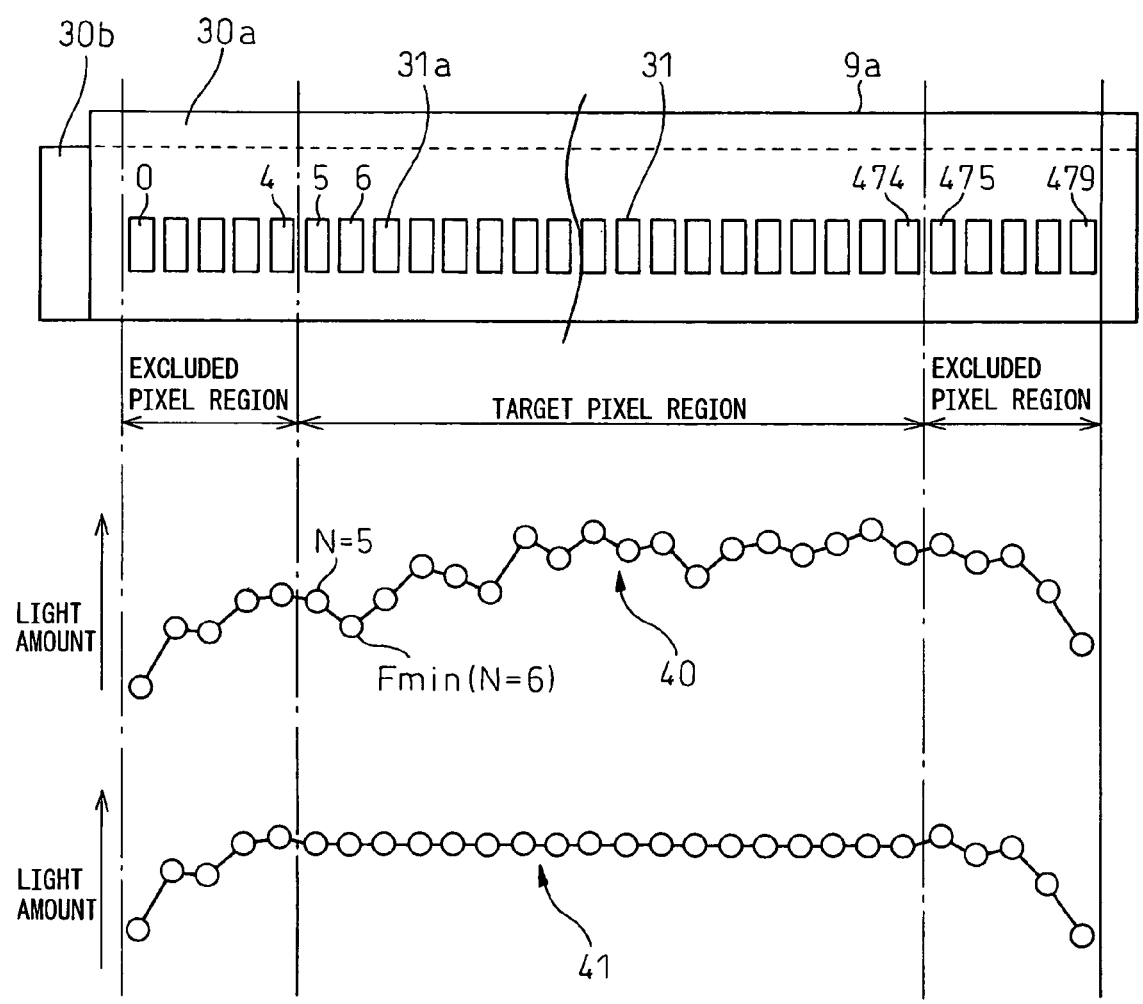
FIG. 16 is a diagram showing an arrangement of pixels on an LCS, a light amount graph showing the amount of illuminating light emerging from the LCS, and a corrected light amount graph showing the result of shading correction.

FIG. 16 shows the arrangement of pixels on the LCS 9a, the light amount distribution characteristic of the illuminating light B emerging from the LCS 9a, the operation of the shading correction circuit 20, and the cooperative operation between the shading correction circuit 20 and the conversion table 36.

As shown in FIG. 16, the LCS 9a is constructed from two glass substrates 30a and 30b bonded together with a slight gap interposed therebetween. Transparent electrodes (not shown) are formed on the glass substrates 30a and 30b, and a liquid crystal material (not shown) is filled into the gap between the substrates 30a and 30b. A pixel array 31 formed by the transparent electrodes comprises a plurality of substantially rectangular shaped pixels 31a arranged in a line. The shape of the pixels 31a is not limited to a particular shape, but the pixels may be formed, for example, in the shape of a parallelogram tilted at a prescribed angle. Further, the pixels in the pixel array 31 may be arranged in a staggered pattern.

The portion other than the portion where the pixel array 31 is formed is covered with a light-blocking film (not shown) so that the light can be passed only through the plurality of pixels 31a forming the pixel array 31. The emergent light A from the LED unit 9b is allowed to pass through the plurality of pixels 31a or blocked in accordance with the drive voltage applied between the transparent electrodes formed on the glass substrates 30a and 30b sandwiching the liquid crystal material therebetween. Accordingly, the LCS 9a acts as an optical shutter that optically modulates the emergent light A in accordance with the LCS drive signal P7. Usually, a drive IC for applying the drive voltage to the transparent electrodes is mounted on the glass substrate 30a or 30b of the LCS 9a, but is not shown here. In the present embodiment, the number of pixels 31a forming the pixel array 31 is 480 in order to print a VGA-size image; the pixel at the leftmost end of the pixel array is designated as N=0, while the pixel at the rightmost end of the pixel array is designated as N=479. For convenience of explanation, only some of the pixels are shown here. It will also be appreciated that the number of pixels may be determined as desired to match the specification of the exposure apparatus.

A light amount graph 40 shows one example of the light amount distribution of the illuminating light B emerging from the pixels 31a when all the pixels 31a in the pixel array 31 on the LCS 9a are driven under the same condition. The X axis corresponds to the pixel array 31 on the LCS 9a, and the Y axis represents the light amount. As is apparent from the light amount graph 40, the amount of the light emerging from the pixel array 31 varies among the pixels 31a. The variation of the light amount is caused by various factors, and the cause differs for each exposure head. The light amount graph 40 also shows a large variation and drop in the amount of light in each of the left and right edge regions (the excluded pixel regions); a major factor contributing to this is presumed to be the variations in the optical modulation characteristics near both ends of the pixel array on the LCS 9a. A major cause for the variations in the optical modulation characteristics near both ends of the pixel array is believed to be due to the sealant (not shown) provided near both ends of the pixel array in the construction of the LCS. That is, as the portions near both ends of the pixel array are close to the positions where the sealant is provided, it is believed that impurities, unhardened resin particles, etc. in the sealant adversely affect the orientation film and the liquid crystal material used in the construction of the LCS and, as a result, the response characteristics near both ends of the pixel array on the LCS are caused to change compared with the response characteristics near the center portion of the pixel array.

Figure 12:
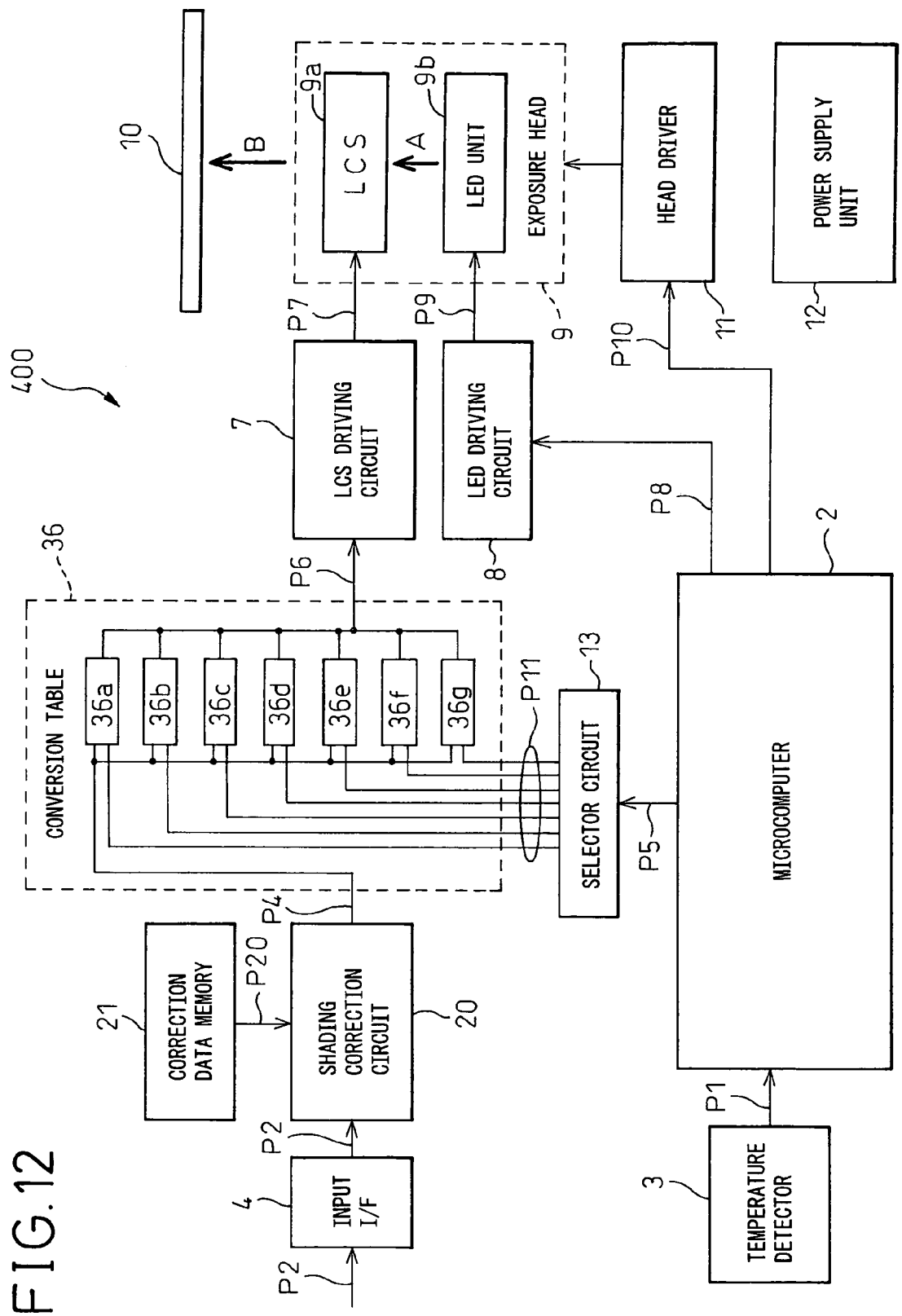
FIG. 12 is a circuit block diagram showing an overview of an exposure apparatus 400 according to the present invention.

If the photosensitive material 10 is exposed to image light by using the exposure head 9 having an uneven light amount distribution characteristic such as shown by the light amount graph 40, density unevenness occurs in the image and an image of good quality cannot be obtained. The shading correction circuit 20 shown in the circuit block diagram of FIG. 12 has the function of reducing the density unevenness on the photosensitive material 10 by correcting for the light amount variations occurring among the pixels 31a of the LCS 9a. That is, the amount of light emerging from each pixel of the LCS 9a is measured using a light amount measuring instrument (not shown), and correction data computed from the light amount data measured for each pixel is stored in the correction data memory 21. The shading correction circuit 20 performs computation to correct the input image data P2 based on the correction data P20 stored in the correction data memory 21, and outputs the grayscale data P4 corrected for each pixel of the LCS 9a.

A corrected light amount graph 41 shows one example of the result of the light amount correction applied by the shading correction circuit 20. As can be seen from a comparison between the light amount graph 40 without the light amount correction and the light amount graph 41 with the light amount correction, the effect of the shading correction circuit 20 is obvious, and the light amount variations are greatly improved in most of the regions of the pixel array 31 on the LCS 9a. However, the light amount variations remain uncorrected in the excluded pixel regions at the left and right ends of the pixel array 31. As the light amount appreciably drops and varies in the regions at the left and right ends of the pixel array, these regions are excluded from the correction target, because, if the correction were also applied to these regions, the amount of light emerging from the pixel array would drop as a whole, leading to the possibility of underexposure of the photosensitive material 10. Usually, it is preferable to exclude about five pixels at each end of the pixel array from the correction target, but the number of pixels to be excluded may be changed appropriately by considering the degree of the light amount variation. Further, such excluded pixels regions may not be provided.

FIG. 17 shows one example of a correction data table.

One example of how the correction data P20 are stored in the correction data memory 21 will be described based on the correction data table shown in FIG. 17. The correction data P20 are stored in the correction data memory 21 in the form of corrected grayscale data for all the grayscale levels of all the pixels (N=0 to 479) on the LCS 9a. Here, the grayscale level refers to the grayscale level of the image data P2 to be input to the shading correction circuit 20; since the image data P2 is an 8-bit grayscale signal, the grayscale level is represented by one of the values of 0 to 255. However, the grayscale range is not limited to this particular range. Here, if the pixel outputting the light of the smallest amount in the target pixel region (the region of N=5 to 474), i.e., the region excluding the excluded pixel regions, is N=6, and its minimum light amount is denoted by Fmin, then all the other pixels in the target pixel region are corrected relative to the minimum light amount Fmin of the pixel N=6.

As a result, the correction data for the pixel N=6 becomes equal to the grayscale level of the input image data P2, but the correction data for every other pixel becomes smaller than the grayscale level of the image data P2. For example, the light amount of the pixel N=5 (the pixel at the leftmost end of the target pixel region) is slightly higher than that of the pixel N=6 of the minimum light amount Fmin, as shown by the light amount graph 40 in FIG. 16; therefore, in the correction data table of FIG. 17, the correction data computed for the pixel N=5 becomes smaller than the correction data for the pixel N=6 over the entire grayscale range, and its maximum grayscale value is 252. More specifically, in the case of the pixel N=6 (with the minimum light amount Fmin), when the image data P2 of the maximum grayscale level (255) is input to the shading correction circuit 20, the image data P2 is output as the grayscale data P4 without any correction, as the value of its correction data is 255. However, for the pixel N=5, as the value of its correction data is 252, the image data P2 of the maximum grayscale level (255) is converted into the correction data whose value is 252, and this correction data is output as the grayscale data P4. In this way, the image data P2 for every pixel is corrected relative to the minimum light amount Fmin, and the light amount variations among the pixels can thus be reduced.

When the correction data table of FIG. 17 is viewed from another standpoint, the correction data corresponding to the maximum grayscale level (i.e., 255) of the image data P2 has a value smaller than 255 for all the pixels other than the pixel N=6 of the minimum light amount Fmin. That is, when the shading correction circuit 20 is operated, most of the maximum grayscale data are converted into values smaller than 255, and the thus converted data is output as the grayscale data P4 for supply to the conversion table 36. Stated another way, the shading correction circuit 20 functions so as to cause the maximum grayscale data of the grayscale data P4, to be input to the conversion table 36, to shift toward the first grayscale range (240 and less). For example, in the case of the pixel N=123 in FIG. 17, as the maximum grayscale value of the corrected grayscale data P6 is corrected to 240, the maximum grayscale aperture open time for the pixel N=123 is about 2.1 mS in the case of the corrected grayscale data P6D, as shown in FIG. 14A, and the aperture open time does not become longer than this value.

This is effective in obtaining a good quality image by suppressing the tendency for the white density to become intensified (the tendency for whiteout to become noticeable) which occurs when the corrected grayscale data P6 are made to converge in the region of 240 to 255 of the grayscale data P4 (i.e., in the second grayscale range) and the maximum grayscale aperture open time in each of the conversion tables 36a to 36g, which corresponds to the maximum grayscale data (grayscale value=255), is made to become equal to the maximum grayscale open time in the conversion table 36a. That is, in the exposure apparatus 400 according to the present invention, with the operation of the shading correction circuit 20 in conjunction with the operation for making the maximum grayscale aperture open time in each of the conversion tables 36a to 36g corresponding to the maximum grayscale data (grayscale value=255) become equal to the maximum grayscale open time in the conversion table 36a, not only can the print time be maintained constant, but the tendency for the white density to become intensified can also be alleviated and the density unevenness reduced; this achieves the printing of a visually pleasing, high-quality image.

Furthermore, as the light amount variations among the pixels of the LCS 9a are reduced as described above, no appreciable problems occur in image quality even in the case of an exposure apparatus that does not require the provision of the shading correction circuit 20 or the correction for the light amount; moreover, as the print time is maintained constant irrespective of temperature variations, and an image of stable quality can be printed, the effect of the invention is enormous. In the correction data table of FIG. 17, the correction data in the excluded pixel region (N=0 to 4) is set equal to the correction data for the pixel N=5, while the correction data in the excluded pixel region (N=475 to 479) is set equal to the correction data for the pixel N=474. This is to avoid problems, such as reduced light amount, that would occur if the correction were also applied to the excluded pixel regions, as previously described, but the correction method for the excluded pixel regions is not limited to any particular method. Further, the correction data table of FIG. 17 has shown the correction data for the emergent light from the red LED in the LED unit 9b, but actually the correction data are also obtained for the emergent light from the green LED and the blue LED in the same manner as described above, and the correction data thus obtained are also stored in the correction data memory 21.

As described above, according to the present invention, even when the conversion tables are switched from one to another as the temperature changes, the one-line print time does not change and the time required to print on the photosensitive material is constant at all times; therefore, the invention can provide an exposure apparatus that is easy and intuitive to use. In particular, if the print time becomes longer as the ambient temperature drops whereas the print speed is relatively fast at normal temperatures around 25° C., this presents a problem in terms of usability, but the invention can solve this problem by making provisions to maintain the print time constant irrespective of temperature variations. Furthermore, as temperature variations are compensated for by changing the conversion table as the ambient temperature changes, the hue and density of halftone portions are stable irrespective of temperature variations, and an image of good quality can be printed. In particular, in the case of a portable type exposure apparatus that is often used in an outdoor environment, the effect of the present invention is enormous because such an exposure apparatus is susceptible to changes in the ambient temperature.

The exposure apparatus according to the present invention has been described by assuming a full-color digital exposure apparatus, but the invention is not limited to the apparatus of this type but can also be applied to a monochrome exposure apparatus.

Further, the exposure apparatus according to the present invention has been described by assuming a line exposure type exposure apparatus that uses a line light source and an LCS having pixels arranged in a line, and that prints on a prescribed area one line at a time, but the invention is not limited to this particular type of apparatus but can also be applied to an exposure apparatus of the type that prints a plurality of lines at a time or to a surface exposure type exposure apparatus that uses a surface-area light source and a surface-area LCS. Furthermore, even when the exposure apparatus according to the present invention is of the type that uses a line light source and an LCS having pixels arranged in a line, the invention can be adapted to the type that performs exposure by moving the LCS across a stationary photosensitive material, as well as to the type that performs exposure by moving a photosensitive material relative to a stationary LCS.

In the exposure apparatus according to the present invention, not only the LCS but other types of optical shutter such as a PLZT can also be employed.

The configurations of the various exposure apparatuses according to the present invention have been shown in schematic form in FIGS. 1, 5, 8, 10, and 12, but the present invention is not limited to these particular configurations; for example, instead of using the microcomputer 2, a custom IC implementing each circuit block in hardware may be used.

Further, the flowchart illustrating the conversion table switching operation has been shown in FIG. 4, but the present invention is not limited to this particular operation flow, and any operation flow may be employed as long as the flow is designed to implement the intended functions.

In the description of the exposure apparatuses according to the present invention, the conversion tables 6, 16, 26, and 36 have each been shown as comprising seven steps, but the present invention is not limited to this specific number of steps; for example, the number of steps may be increased if correction with higher precision is to be achieved, or the number of steps may be reduced if correction with high precision is not needed.

Further, in the description of the exposure apparatuses according to the present invention, the maximum aperture open time has been shown as 3 mS, the mask time as 1 mS, and the one-line print time as 4 mS, but the present invention is not limited to these specific values; rather, the values may be chosen appropriately in accordance with the characteristics of the LCS 9a, the output light amount of the LED unit 9b, the sensitivity characteristic of the photosensitive material 10, etc.

Each of the exposure apparatuses according to the present invention has been described as being the type that maintains the one-line print time constant over the entire operating temperature range, but the present invention is not limited in its application to this type of apparatus but can be applied to any type of apparatus as long as the apparatus has a plurality of converting means, each covering a different temperature range, and is designed to maintain the print time per unit area (for example, one line) constant for all the converting means.

Figure 18:
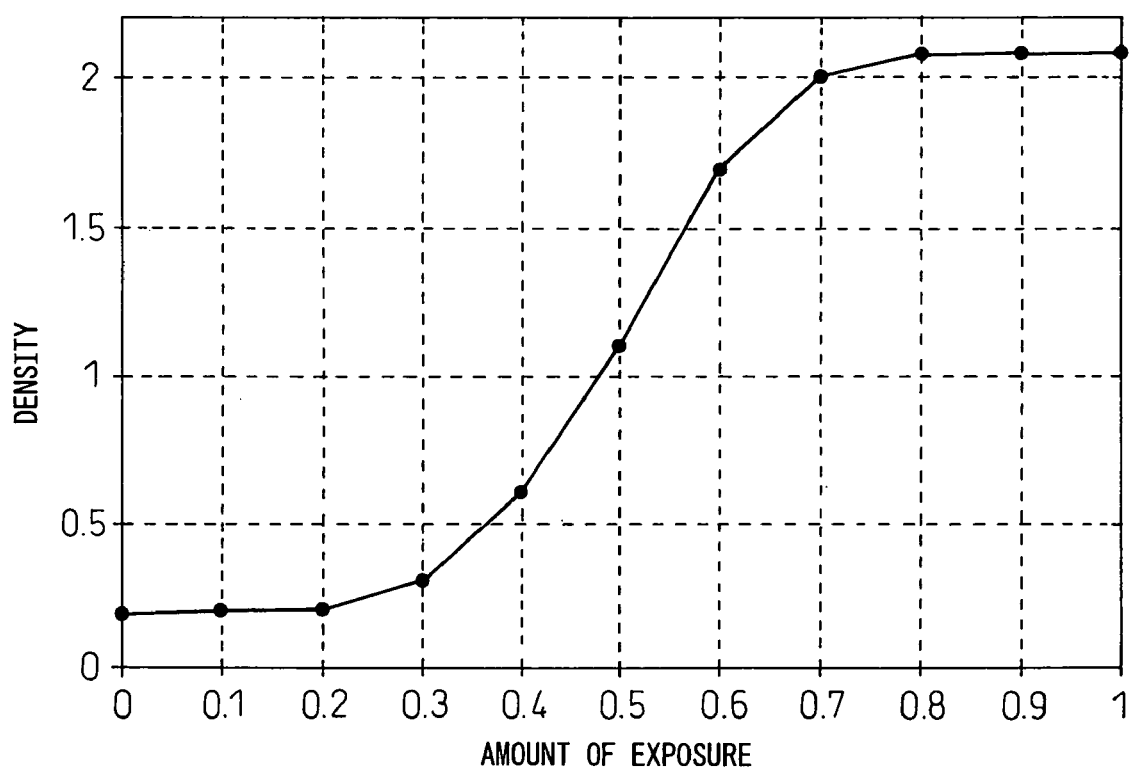
FIG. 18 is an explanatory diagram showing the relationship between the amount of exposure light and density on another photosensitive material.

Further, the photosensitive material used in each of the exposure apparatuses according to the present invention is not limited to photographic paper, silver-halide instant film, or the like, but various other types of photosensitive material can be used in each of the exposure apparatuses according to the present invention. For example, each of the exposure apparatuses according to the present invention has been described as using the photosensitive material 10 of the type, such as instant film, whose color density decreases as the amount of exposure light increases, as shown in FIG. 2A. However, in each of the exposure apparatuses according to the present invention, it is also possible to use a photosensitive material of the type whose color density increases as the amount of exposure light increases, as shown in FIG. 18. That is, the photosensitive material shown in FIG. 18 develops a black color, not white, when exposed to light corresponding to the maximum grayscale data.

The invention claimed is:

1. An exposure apparatus comprising:
    temperature detector for detecting an ambient temperature;
    a plurality of converters for converting input grayscale data into corrected grayscale data so as to correct for nonlinearity of exposure density;
    an exposure member for performing grayscale exposure on a photosensitive material based on said corrected grayscale data; and
    a selecting member for selecting an appropriate one of said converter in accordance with said ambient temperature detected by said temperature detector, wherein
    said plurality of converters are set up so that each range of amount of exposure light is divided into substantially equal regions corresponding to a temperature region to be covered by each of said plurality of converter.

2. The exposure apparatus according to claim 1, wherein said plurality of converters correct for at least either a change in the amount of exposure light of said exposure member with respect to said detected temperature or a change in sensitivity characteristic of said photosensitive material with respect to said detected temperature.

3. The exposure apparatus according to claim 1, wherein said plurality of converters are set up so that each temperature range to be covered by each of said plurality of converters is divided into regions of unequal width.

4. The exposure apparatus according to claim 3, wherein said plurality of converters are set up so that any converter to be used in a higher temperature region covers a wider temperature range than any converter to be used in a lower temperature region.

5. The exposure apparatus according to claim 1, further comprising:
    a line light source for exposure, and wherein
    said exposure member is a shutter member for optically modulating light emerging from said line light source, and said shutter member performs said grayscale exposure on said photosensitive material by optically modulating the light emerging from said line light source while controlling an aperture open time in accordance with said corrected grayscale data supplied from said converter, and wherein
    the aperture open time of said shutter member corresponding to maximum grayscale data is set substantially constant for all of said plurality of converters.

6. The exposure apparatus according to claim 5, wherein a grayscale data range to be controlled by each of said plurality of converters having a first grayscale range where a relationship between said grayscale data for each of said plurality of converters and the aperture open time of said shutter member matches the grayscale density on said photosensitive material, and a second grayscale range where the relationship between said grayscale data for each of said plurality of converters and said aperture open time does not match the grayscale density on said photosensitive material.

7. The exposure apparatus according to claim 6, wherein said second grayscale range is a grayscale range where a grayscale value is large.

8. The exposure apparatus according to claim 1, further comprising:
    a line light source for exposure; and
    a light amount correcter, and wherein:
    said exposure member is a shutter member for optically modulating light emerging from said line light source,
    said light amount correcter applies a light amount correction to correct for a variation in the amount of said emergent light optically modulated by said shutter member,
    each of said plurality of converters outputs said corrected grayscale data by nonlinearly correcting the grayscale data corrected by said light amount correcter, and
    said shutter member performs said grayscale exposure on said photosensitive material by optically modulating the light emerging from said line light source while controlling an aperture open time in accordance with said corrected grayscale data supplied from said converter with said light amount correction superimposed thereon, wherein the aperture open time of said shutter member corresponding to maximum grayscale data is set substantially constant for all of said plurality of converter.

9. The exposure apparatus according to claim 8, wherein a grayscale data range to be controlled by each of said plurality of converters comprises a first grayscale range where a relationship between said grayscale data for each of said plurality of converter and the aperture open time of said shutter member matches grayscale density on said photosensitive material, and a second grayscale range where the relationship between said grayscale data for each of said plurality of converter and said aperture open time does not match the grayscale density on said photosensitive material.

10. The exposure apparatus according to claim 9, wherein said second grayscale range is a grayscale range where a grayscale value is large.

11. The exposure apparatus according to claim 1, further comprising:

a light source for exposure, and wherein said exposure member is a shutter member for optically modulating light emerging from said light source, and said shutter member performs said grayscale exposure on said photosensitive material by optically modulating the light emerging from said light source while controlling an aperture open time in accordance with said corrected grayscale data supplied from said converter, and wherein a print time per unit area is set substantially constant for all of said plurality of converters.

12. The exposure apparatus according to claim 11, wherein said print time per unit area is the time required to print one line on said photosensitive material.

13. The exposure apparatus according to claim 12, wherein said print time required to print one line includes a mask time for performing data transfer and the like and a maximum grayscale aperture open time of said shutter member corresponding to maximum grayscale data.

14. The exposure apparatus according to claim 13, wherein said print time required to print one line is the sum of said mask time and a maximum aperture open time which is the longest maximum grayscale aperture open time of all the maximum grayscale aperture open times defined by said converter.

15. The exposure apparatus according to claim 14, wherein said mask time is varied among said plurality of converters so that said print time required to print one line becomes substantially constant for all of said plurality of converter.

16. The exposure apparatus according to claim 14, wherein said mask time is held constant for each of said plurality of converter, and a grayscale aperture close time is provided in addition to said maximum grayscale aperture open time so that said print time required to print one line becomes substantially constant for all of said plurality of converter.

17. The exposure apparatus according to claim 16, wherein said grayscale aperture close time is equal to a time difference between said maximum aperture open time and said maximum grayscale aperture open time in each of said plurality of converters.

18. The exposure apparatus according to claim 14, wherein said mask time is held constant for each of said plurality of converter, and said maximum grayscale aperture open time is set approximately equal to said maximum aperture open time.

19. The exposure apparatus according to claim 18, wherein a grayscale data range to be controlled by each of said plurality of converter comprises a first grayscale range where a relationship between said grayscale data for each of said plurality of converter and the aperture open time of said shutter member substantially matches grayscale density on said photosensitive material, and a second grayscale range where the relationship between said grayscale data for each of said plurality of converter and said aperture open time does not match the grayscale density on said photosensitive material.

20. The exposure apparatus according to claim 19, wherein said second grayscale range is a grayscale range where a grayscale value is large.

21. The exposure apparatus according to claim 1, further comprising:

a light source for exposure; and a light amount corrector, and wherein said exposure member is a shutter member for optically modulating light emerging from said light source, said light amount correcter applies a light amount correction to correct for a variation in the amount of said emergent light optically modulated by said shutter member, each of said plurality of converter outputs said corrected grayscale data by nonlinearly correcting the grayscale data, such as image data, corrected by said light amount correcter, and said shutter member performs said grayscale exposure on said photosensitive material by optically modulating the light emerging from said line light source while controlling an aperture open time in accordance with said corrected grayscale data supplied from said plurality of converter with said light amount correction superimposed thereon, wherein a mask time is held constant for each of said plurality of converters, and a maximum grayscale aperture open time in each of said plurality of converters is set approximately equal to a maximum aperture open time so that a print time required to print one line becomes substantially constant for all of said plurality of converters.

* * * * *